United States Patent
Kou et al.

(10) Patent No.: US 10,507,582 B2
(45) Date of Patent: Dec. 17, 2019

(54) APPARATUS, ROBOT, METHOD, AND RECORDING MEDIUM

(71) Applicant: Panasonic Intellectual Property Management Co., Ltd., Osaka (JP)

(72) Inventors: Shiki Kou, Shiga (JP); Kohei Tahara, Osaka (JP); Yusaku Ota, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/027,426

(22) Filed: Jul. 5, 2018

(65) Prior Publication Data

US 2019/0015982 A1 Jan. 17, 2019

(30) Foreign Application Priority Data

Jul. 11, 2017 (JP) .................................. 2017-135289

(51) Int. Cl.
| | |
|---|---|
| B25J 9/16 | (2006.01) |
| B25J 11/00 | (2006.01) |
| A63H 11/00 | (2006.01) |
| A63H 3/28 | (2006.01) |
| G05B 23/02 | (2006.01) |

(52) U.S. Cl.
CPC .............. *B25J 9/1666* (2013.01); *A63H 3/28* (2013.01); *A63H 11/00* (2013.01); *B25J 9/1697* (2013.01); *B25J 11/003* (2013.01); *G05B 23/02* (2013.01); *A63H 2200/00* (2013.01); *G05B 2219/45007* (2013.01)

(58) Field of Classification Search
CPC ...... B25J 9/1666; B25J 11/003; B25J 9/1697; A63H 3/28; A63H 11/00; A63H 2200/00; G05B 23/02; G05B 2219/45007
USPC ................................................ 700/245, 259
See application file for complete search history.

(56) References Cited

U.S. PATENT DOCUMENTS

| | | | | |
|---|---|---|---|---|
| 5,321,614 A | * | 6/1994 | Ashworth ............ | G05D 1/0227 180/167 |
| 5,995,884 A | * | 11/1999 | Allen .................... | G05D 1/0225 701/24 |
| 8,584,306 B2 | * | 11/2013 | Chung ................. | G05D 1/0242 15/319 |
| 2002/0188380 A1 | * | 12/2002 | Ross ..................... | B62D 57/024 700/245 |

(Continued)

FOREIGN PATENT DOCUMENTS

| | | |
|---|---|---|
| JP | 2011-044098 | 3/2011 |
| JP | 2011-067885 | 4/2011 |

*Primary Examiner* — Jaime Figueroa

(74) *Attorney, Agent, or Firm* — Greenblum & Bernstein, P.L.C.

(57) ABSTRACT

In a case where an apparatus that is moved by a user is moved in a vertical direction, when a distance from an object located in the same two-dimensional position as the apparatus and directly underneath the apparatus is greater than a height, which corresponds to the two-dimensional position and which possibly damages the apparatus when the apparatus falls, a display is caused to perform a first display and a speaker is caused to output a first sound. When the distance is equal to or shorter than the height, the display is caused to perform a second display and the speaker is caused to output a second sound.

21 Claims, 18 Drawing Sheets

(56) References Cited

U.S. PATENT DOCUMENTS

| | | | |
|---|---|---|---|
| 2005/0182518 A1* | 8/2005 | Karlsson | G05D 1/0246 700/253 |
| 2005/0251457 A1* | 11/2005 | Kashiwagi | A47L 9/009 705/26.1 |
| 2009/0281661 A1* | 11/2009 | Dooley | B60L 50/66 700/258 |
| 2011/0202175 A1* | 8/2011 | Romanov | A47L 11/4011 700/250 |
| 2012/0165977 A1* | 6/2012 | Sanchez | B25J 5/007 700/245 |
| 2016/0158941 A1* | 6/2016 | Hung | G05D 1/0242 700/258 |
| 2016/0188985 A1* | 6/2016 | Kim | G01S 17/46 701/28 |
| 2016/0221195 A1* | 8/2016 | Ashworth | B25J 5/00 |
| 2017/0325647 A1* | 11/2017 | Kwak | A47L 9/009 |

\* cited by examiner

| ROOM NAME | POSITION RANGE | MATERIAL | HEIGHT | DANGEROUS HEIGHT 1 | DANGEROUS HEIGHT 2 |
|---|---|---|---|---|---|
| | X301 | X302 | X303 | X304 | X305 | X306 |
| LIVING ROOM | {...} | CARPET | 0 cm | 30 cm | 60 cm |
| LIVING ROOM | {...} | FLOORING | 0 cm | 10 cm | 20 cm |
| LIVING ROOM | {...} | SOFA | 30 cm | 50 cm | 100 cm |
| LIVING ROOM | {...} | TELEVISION | 80 cm | 0 cm | 0 cm |
| LIVING ROOM | {...} | BOOKSHELF | 190 cm | 0 cm | 0 cm |
| BEDROOM 1 | {...} | TATAMI MAT | 0 cm | 30 cm | 60 cm |
| BEDROOM 2 | {...} | FLOORING | 0 cm | 10 cm | 20 cm |
| BEDROOM 2 | {...} | BED | 30 cm | 50 cm | 100 cm |
| BEDROOM 2 | {...} | DESK | 50 cm | 10 cm | 20 cm |
| BATHROOM | {...} | TILE | 0 cm | 5 cm | 10 cm |
| ... | ... | ... | ... | ... | ... |

FIG. 4

| MATERIAL | DANGEROUS HEIGHT 1 | DANGEROUS HEIGHT 2 |
|---|---|---|
| CARPET | 30 cm | 60 cm |
| FLOORING | 10 cm | 20 cm |
| TATAMI MAT | 30 cm | 60 cm |
| TILE | 5 cm | 10 cm |
| SOFA | 50 cm | 100 cm |
| BED | 50 cm | 100 cm |
| DESK | 10 cm | 20 cm |
| ... | ... | ... |

# APPARATUS, ROBOT, METHOD, AND RECORDING MEDIUM

BACKGROUND

1. Technical Field

The present disclosure relates to an apparatus that is moved by a user, a robot, a method, and a recording medium.

2. Description of the Related Art

Conventionally, there have been proposed various methods for controlling, with reference to information indicating a distance in vertical direction (height) from an apparatus that is moved by a user to a reference horizontal plane, the action of the apparatus.

For example, in order for a worker to efficiently inspect target equipment, Japanese Unexamined Patent Application Publication No. 2011-44098 proposes measuring the height that the worker is above the ground and, in a case where the height thus measured comes close to the height of a place that is to be inspected, making a sound to notify the worker.

Further, in order to surely avoid inadvertent screwing with an electric driver tilted, Japanese Unexamined Patent Application Publication No. 2011-67885 proposes measuring the angle at which the electric driver is tilted and the height at which the electric driver is and, in a case where the electric driver is tilted at an angle equal to or larger than a threshold angle and comes within a threshold height with respect to an object to be screwed, making a warning sound.

SUMMARY

In one general aspect, the techniques disclosed here feature an apparatus that is moved by a user, including: a first sensor that detects a motion of and a moving direction of the apparatus; a second sensor that measures a movement distance in vertical direction of the apparatus; a camera that acquires a picture of an area around the apparatus; a processor; a display; and a speaker, wherein the processor determines, on the basis of a result of detection yielded by the first sensor, whether the apparatus has been moved in a vertical direction, in a case where the processor has determined that the apparatus has been moved in a vertical direction, the processor calculates, on the basis of a result of detection yielded by the second sensor, a distance from an object located directly underneath the apparatus to the apparatus, the processor measures a two-dimensional position of the apparatus on the basis of a picture acquired from the camera, the processor compares the distance thus calculated with a height corresponding to the two-dimensional position thus measured in a first table showing a correspondence relationship between a two-dimensional position of the apparatus and a height that possibly damages the apparatus if the apparatus falls in the two-dimensional position, in a case where the distance thus calculated is longer than the height corresponding to the two-dimensional position thus measured, the processor causes the display to perform a first display and causes the speaker to output a first sound, and in a case where the distance thus calculated is not longer than the height corresponding to the two-dimensional position thus measured, the processor causes the display to perform a second display and causes the speaker to output a second sound.

The aspect has brought about further improvement.

These general and specific aspects may be implemented using a system, a method, and a computer program, and any combination of systems, methods, and computer programs.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 is a diagram showing an example of a position dangerous height table;

FIG. 4 is a diagram showing an example of a material dangerous height table;

DETAILED DESCRIPTION

Figure 1:
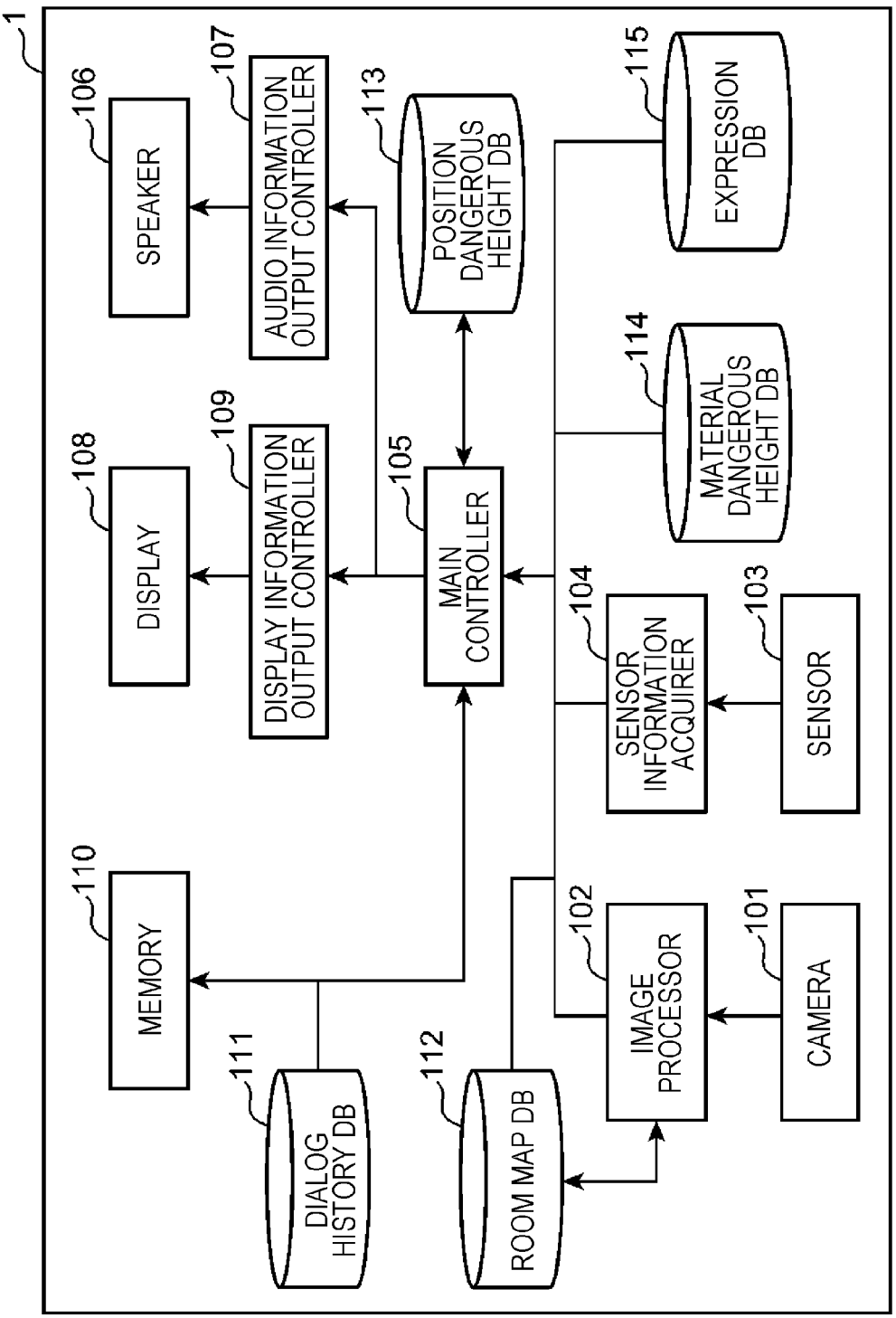
FIG. 1 is a block diagram showing an example of a functional configuration of a robot according to a first embodiment of the present disclosure.

Underlying Knowledge Forming Basis of the Present Disclosure

Studies have been conducted on a robot that plays with a user in a state of being lifted by the user. In a case where such a robot is for example inadvertently dropped onto a hard floor by a user after having been lifted by the user, the robot may become broken. This is prevented by a known technology for measuring a height to which the robot has been lifted and, in a case where the height thus measured becomes equal to or greater than a threshold height, issuing a warning to the user by means of facial expression, speech, or the like.

For example, in order for a worker to efficiently inspect target equipment, Japanese Unexamined Patent Application Publication No. 2011-44098 describes a technology for measuring the height that the worker is above the ground and, in a case where the height thus measured comes close to the height of a place that is to be inspected, making a sound to notify the worker.

Further, in order to surely avoid inadvertent screwing with an electric driver tilted, Japanese Unexamined Patent Application Publication No. 2011-67885 describes a technology for measuring the angle at which the electric driver is tilted and the height at which the electric driver is and, in a case where the electric driver is tilted at an angle equal to or larger than a threshold angle and comes within a threshold height with respect to an object to be screwed, making a warning sound.

It is conceivable that these technologies may be applied to the aforementioned robot to issue a warning to the user in a case where a measured height at which the robot is comes close to a threshold height that the robot may become broken if it falls from. However, in this case, fixing the threshold height at a height above a floor surface causes a warning to be unnecessarily issued to the user even when the robot is lifted to the threshold height from an upper surface of an object having a height (such as a desk or a sofa) or a floor surface of a soft material (such as a carpet or a tatami mat) and therefore does not become broken even if it falls.

To address this problem, the inventor studied to appropriately notify the user whether an apparatus that is moved by a user such as the aforementioned robot possibly gets damaged if it falls, and finally conceived of aspects of the present disclosure.

An apparatus according to a first aspect of the present disclosure is an apparatus that is moved by a user, including: a first sensor that detects a motion of and a moving direction of the apparatus; a second sensor that measures a movement distance in vertical direction of the apparatus; a camera that acquires a picture of an area around the apparatus; a processor; a display; and a speaker, wherein the processor determines, on the basis of a result of detection yielded by the first sensor, whether the apparatus has been moved in a vertical direction, in a case where the processor has determined that the apparatus has been moved in a vertical direction, the processor calculates, on the basis of a result of detection yielded by the second sensor, a distance from an object located directly underneath the apparatus to the apparatus, the processor measures a two-dimensional position of the apparatus on the basis of a picture acquired from the camera, the processor compares the distance thus calculated with a height corresponding to the two-dimensional position thus measured in a first table showing a correspondence relationship between a two-dimensional position of the apparatus and a height that possibly damages the apparatus if the apparatus falls in the two-dimensional position, in a case where the distance thus calculated is longer than the height corresponding to the two-dimensional position thus measured, the processor causes the display to perform a first display and causes the speaker to output a first sound, and in a case where the distance thus calculated is not longer than the height corresponding to the two-dimensional position thus measured, the processor causes the display to perform a second display and causes the speaker to output a second sound.

According to this configuration, in a case where the apparatus has been moved in a vertical direction, when a distance from an object located directly underneath the apparatus to the apparatus is longer than a height, corresponding to a two-dimensional position of the apparatus, that possibly damages the apparatus if the apparatus falls, the first display is performed and the first sound is outputted. On the other hand, when a distance from an object located directly underneath the apparatus to the apparatus is not longer than a height, corresponding to a two-dimensional position of the apparatus, that possibly damages the apparatus if the apparatus falls, the second display is performed and the second sound is outputted.

For this reason, in a case where the apparatus has been moved in a vertical direction in a space where heights of objects located directly underneath the apparatus vary according to two-dimensional positions of the apparatus, the user can be appropriately notified whether the apparatus possibly gets damaged if it falls, depending on a distance to an object located directly underneath the apparatus.

Further, in the first aspect, in a case where the processor has determined that the apparatus has not been moved in a vertical direction, the processor may determine, on the basis of a result of detection yielded by the first sensor, whether the apparatus has been moved in a horizontal direction, in a case where the processor has determined that the apparatus has been moved in a horizontal direction, the processor may measure a two-dimensional position of the apparatus on the basis of the picture, the processor may calculate the distance with reference to a second table showing a correspondence relationship between a two-dimensional position of the apparatus and a height of an object that is present in the two-dimensional position, the processor may compare the distance thus calculated with a height corresponding to the two-dimensional position thus measured in the first table, in a case where the distance thus calculated is longer than the height corresponding to the two-dimensional position thus measured, the processor may cause the display to perform the first display and cause the speaker to output the first sound, and in a case where the distance thus calculated is not longer than the height corresponding to the two-dimensional position thus measured, the processor may cause the display to perform the second display and cause the speaker to output the second sound.

According to this configuration, in a case where the apparatus has been moved in a horizontal direction, when a distance from an object located directly underneath the apparatus to the apparatus is longer than a height, corresponding to a two-dimensional position of the apparatus, that possibly damages the apparatus if the apparatus falls, the first display is performed and the first sound is outputted. On the other hand, when a distance from an object located directly underneath the apparatus to the apparatus is not longer than a height, corresponding to a two-dimensional position of the apparatus, that possibly damages the apparatus if the apparatus falls, the second display is performed and the second sound is outputted.

For this reason, in a case where the apparatus has been moved in a horizontal direction in a space where heights of objects located directly underneath the apparatus vary according to two-dimensional positions of the apparatus, the user can be appropriately notified whether the apparatus possibly gets damaged if it falls, depending on a distance to an object located directly underneath the apparatus.

Further, in the first aspect, it is preferable that the display display a facial expression of the apparatus with both eyes and a mouth, that the first display show a fearful or confused facial expression, and that the first sound raise an alarm or request the user to move the apparatus to a lower height.

According to this configuration, in a case where the apparatus possibly gets damaged if it falls, a fearful or confused facial expression is displayed with both eyes and a mouth, and a sound is outputted that raises an alarm or requests the user to move the apparatus to a lower height. This makes it possible to, by means of this display or sound, easily let the user know that the apparatus possibly gets damaged if it falls.

Further, in the first aspect, it is preferable that the display display a facial expression of the apparatus with both eyes and the mouth, that the second display show a joyful facial expression, and that the second sound be positive about a height at which the apparatus is.

According to this configuration, in a case where the apparatus does not possibly get damaged even if it falls, a joyful facial expression is displayed with both eyes and the mouth, and a sound is outputted that is positive about the height at which the apparatus is. This makes it possible to, by means of this display or sound, easily let the user know that the apparatus does not possibly get damaged even if it falls.

Further, in the first aspect, it is preferable that in the first table, the height that possibly damages the apparatus if the apparatus falls in the two-dimensional position include a first height and a second height and the second height be higher than the first height, that the first display include a third display and a fourth display, that the first sound include a third sound and a fourth sound, that the display display a facial expression of the apparatus with both eyes and a mouth, that in a case where the distance thus calculated is longer than the first height corresponding to the two-dimensional position thus measured and in a case where the distance thus calculated is not longer than the second height corresponding to the two-dimensional position thus measured, the processor cause the display to perform the third display and cause the speaker to output the third sound, that in a case where the distance thus calculated is longer than the second height corresponding to the two-dimensional position thus measured, the processor cause the display to perform the fourth display and cause the speaker to output the fourth sound, that the third display show a confused facial expression, that the fourth display show a fearful facial expression, that the third sound request the user to move the apparatus to a lower height, and that the fourth sound raise an alarm.

According to this configuration, in a case where the apparatus has been moved in a vertical direction, when a distance from an object located directly underneath the apparatus to the apparatus is longer than the first height and not longer than the second height, a confused facial expression is displayed with both eyes and the mouth, and a sound is outputted that requests the user to move the apparatus to a lower height. On the other hand, when the distance is longer than the second height, a fearful facial expression is displayed with both eyes and the mouth, and a sound is outputted that raises an alarm.

This makes it possible to, by means of this display or sound, easily let the user know that the apparatus possibly gets damaged if it falls in a case where the distance is longer than the first height and not longer than the second height and in a case where the distance is longer than the second height. This also makes it possible to, by means of this display or sound, easily let the user know that the apparatus gets more damaged if it falls in a case where the distance is longer than the second height than in a case where the distance is longer than the first height and not longer than the second height.

Further, in the first aspect, the processor may further determine, with reference to a database storing a dialog history between the apparatus and the user, whether in a predetermined period of time before a present time in the dialog history the apparatus requested the user to move the apparatus upward in a vertical direction, and in a case where the processor has determined that the apparatus requested the user to move the apparatus upward in a vertical direction and in a case where the distance thus calculated is longer than the height corresponding to the two-dimensional position thus measured, the processor may cause the display to perform a fifth display and cause the speaker to output a fifth sound.

According to this configuration, even in a case where a distance from an object located directly underneath the apparatus to the apparatus is longer than a height, corresponding to a two-dimensional position of the apparatus, that possibly damages the apparatus if the apparatus falls, the fifth display is performed and the fifth sound is outputted when in the predetermined period of time before the present time the apparatus requested the user to move the apparatus upward in a vertical direction. For this reason, in a case where the user has performed an action of moving the apparatus upward in a vertical direction according to a request from the apparatus, a display or sound that refuses the action can be prevented from being outputted.

Further, in the first aspect, it is preferable that the fifth display show a smile and that the fifth sound express gratitude.

According to this configuration, even if the apparatus has a risk of possibly getting damaged if it falls in a case where the user has moved the apparatus in a vertical direction, a smile is displayed and a sound that expresses gratitude is outputted when in the predetermined period of time before the present time the apparatus requested the user to move the apparatus upward in a vertical direction. For this reason, in a case where the user has performed an action of moving the apparatus upward in a vertical direction according to a request from the apparatus, it is possible to easily let the user know that the apparatus expresses gratitude or appreciation for the action.

Further, in the first aspect, the first sensor and the second sensor may be an acceleration sensor that detects acceleration in horizontal direction and vertical direction of the apparatus.

According to this configuration, the acceleration sensor can be used as both the first sensor and the second sensor. This makes it possible to more simplify the configuration of the apparatus and configure the apparatus more inexpensively than in a case where the first sensor and the second sensor are separately provided.

Further, a robot according to an aspect of the present disclosure is a robot that is moved by a user, including: a first sensor that detects a motion of and a moving direction of the robot; a second sensor that measures a movement distance in vertical direction of the robot; a camera that acquires a picture of an area around the robot; a processor; a display; and a speaker, wherein the processor determines, on the basis of a result of detection yielded by the first sensor, whether the robot has been moved in a vertical direction, in a case where the processor has determined that the robot has been moved in a vertical direction, the processor calculates, on the basis of a result of detection yielded by the second sensor, a distance from an object located directly underneath the robot to the robot, the processor measures a two-dimensional position of the robot on the basis of a picture acquired from the camera, the processor compares the distance thus calculated with a height corresponding to the two-dimensional position thus measured in a first table showing a correspondence relationship between a two-dimensional position of the robot and a height that possibly damages the robot if the robot falls in the two-dimensional position, in a case where the distance thus calculated is longer than the height corresponding to the two-dimensional position thus measured, the processor causes the display to perform a first display and causes the speaker to output a first sound, and in a case where the distance thus calculated is not longer than the height corresponding to the two-dimensional position thus measured, the processor causes the display to perform a second display and causes the speaker to output a second sound.

According to this configuration, in a case where the robot has been moved in a vertical direction, when a distance from an object located directly underneath the robot to the robot is longer than a height, corresponding to a two-dimensional position of the robot, that possibly damages the robot if the robot falls, the first display is performed and the first sound is outputted. On the other hand, when a distance from an object located directly underneath the robot to the robot is not longer than a height, corresponding to a two-dimensional position of the robot, that possibly damages the robot if the robot falls, the second display is performed and the second sound is outputted.

For this reason, in a case where the robot has been moved in a vertical direction in a space where heights of objects located directly underneath the robot vary according to two-dimensional positions of the robot, the user can be appropriately notified whether the robot possibly gets damaged if it falls, depending on a distance to an object located directly underneath the robot.

Further, a method according to an aspect of the present disclosure a method for causing an apparatus that is moved by a user to express an emotion, the apparatus including a first sensor that detects a motion of and a moving direction of the robot, a second sensor that measures a movement distance in vertical direction of the robot, a camera that acquires a picture of an area around the robot, a display, and a speaker, the method including: determining, on the basis of a result of detection yielded by the first sensor, whether the robot has been moved in a vertical direction; in a case of having determined that the apparatus has been moved in a vertical direction, calculating, on the basis of a result of detection yielded by the second sensor, a distance from an object located directly underneath the apparatus to the apparatus; measuring a two-dimensional position of the apparatus on the basis of a picture acquired from the camera; comparing the distance thus calculated with a height corresponding to the two-dimensional position thus measured in a first table showing a correspondence relationship between a two-dimensional position of the apparatus and a height that possibly damages the apparatus if the robot falls in the two-dimensional position; in a case where the distance thus calculated is longer than the height corresponding to the two-dimensional position thus measured, causing the display to perform a first display and causing the speaker to output a first sound; and in a case where the distance thus calculated is not longer than the height corresponding to the two-dimensional position thus measured, causing the display to perform a second display and causing the speaker to output a second sound.

Further, the present disclosure discloses not only such a method for executing characteristic processes but also a program that causes the processor of the apparatus to execute the characteristic processes included in the method. Such a program can of course be distributed via a non-transitory computer-readable recording medium such as a CD-ROM or a communication network such as the Internet.

Further, an apparatus according to a second aspect of the present disclosure is an apparatus that is moved by a user, including: a first sensor that detects a motion of and a moving direction of the apparatus; a third sensor that measures a distance to an object located directly underneath the apparatus; a camera that acquires a picture of an area around the apparatus; a processor; a display; and a speaker, wherein the processor determines, on the basis of a result of detection yielded by the first sensor, whether the apparatus has been moved in a vertical direction, in a case where the processor has determined that the apparatus has been moved in a vertical direction, the processor calculates, on the basis of a result of detection yielded by the third sensor, a distance from an object located directly underneath the apparatus to the apparatus, the processor determines, on the basis of a picture acquired from the camera, a material of the object located directly underneath the apparatus, the processor compares the distance thus calculated with a height corresponding to the material thus determined in a table showing a correspondence relationship between a material of an object and a height that possibly damages the apparatus if the apparatus falls onto the object, in a case where the distance thus calculated is longer than the height corresponding to the material thus determined, the processor causes the display to perform a first display and causes the speaker to output a first sound, and in a case where the distance thus calculated is not longer than the height corresponding to the material thus determined, the processor causes the display to perform a second display and causes the speaker to output a second sound.

According to this configuration, in a case where the apparatus has been moved in a vertical direction, when a distance from an object located directly underneath the apparatus to the apparatus is longer than a height, corresponding to a material of the object located directly underneath the apparatus, that possibly damages the apparatus if the apparatus falls, the first display is performed and the first sound is outputted. On the other hand, when a distance from an object located directly underneath the apparatus to the apparatus is not longer than a height, corresponding to a material of the object located directly underneath the apparatus, that possibly damages the apparatus if the apparatus falls, the second display is performed and the second sound is outputted.

For this reason, in a case where the apparatus has been moved in a vertical direction in a space where heights or materials of objects located directly underneath the apparatus vary according to two-dimensional positions of the apparatus, the user can be appropriately notified whether the apparatus possibly gets damaged if it falls, depending on a distance to an object located directly underneath the apparatus and a material of the object.

Further, in the second aspect, in a case where the processor has determined that the apparatus has not been moved in a vertical direction, the processor may determine, on the basis of a result of detection yielded by the first sensor, whether the apparatus has been moved in a horizontal direction, in a case where the processor has determined that the apparatus has been moved in a horizontal direction, the processor may calculate, on the basis of a result of detection yielded by the third sensor, a distance from an object located directly underneath the apparatus to the apparatus, the processor may determine, on the basis of the picture, a material of the object located directly underneath the apparatus, the processor may compare the distance thus calculated with a height corresponding to the material thus determined in the table, in a case where the distance thus calculated is longer than the height corresponding to the material thus determined, the processor may cause the display to perform the first display and cause the speaker to output the first sound, and in a case where the distance thus calculated is not longer than the height corresponding to the material thus determined, the processor may cause the display to perform the second display and cause the speaker to output the second sound.

According to this configuration, in a case where the apparatus has been moved in a horizontal direction, when a distance from an object located directly underneath the apparatus to the apparatus is longer than a height, corresponding to a material of the object located directly underneath the apparatus, that possibly damages the apparatus if the apparatus falls, the first display is performed and the first sound is outputted. On the other hand, when a distance from an object located directly underneath the apparatus to the apparatus is not longer than a height, corresponding to a material of the object located directly underneath the apparatus, that possibly damages the apparatus if the apparatus falls, the second display is performed and the second sound is outputted.

For this reason, in a case where the apparatus has been moved in a horizontal direction in a space where heights or materials of objects located directly underneath the apparatus vary according to two-dimensional positions of the apparatus, the user can be appropriately notified whether the apparatus possibly gets damaged if it falls, depending on a distance to an object located directly underneath the apparatus and a material of the object.

Further, in the second aspect, it is preferable that the display display a facial expression of the apparatus with both eyes and a mouth, that the first display show a fearful or confused facial expression, and that the first sound raise an alarm or request the user to move the apparatus to a lower height.

According to this configuration, in a case where the apparatus possibly gets damaged if it falls, a fearful or confused facial expression is displayed with both eyes and a mouth, and a sound is outputted that raises an alarm or requests the user to move the apparatus to a lower height. This makes it possible to, by means of this display or sound, easily let the user know that the apparatus possibly gets damaged if it falls.

Further, in the second aspect, it is preferable that the display display a facial expression of the apparatus with both eyes and a mouth, that the second display show a joyful facial expression, and that the second sound be positive about a height at which the apparatus is.

According to this configuration, in a case where the apparatus does not possibly get damaged even if it falls, a joyful facial expression is displayed with both eyes and the mouth, and a sound is outputted that is positive about the height at which the apparatus is. This makes it possible to, by means of this display or sound, easily let the user know that the apparatus does not possibly get damaged even if it falls.

Further, in the second aspect, it is preferable that in the table, the height that possibly damages the apparatus if the apparatus falls onto the object include a third height and a fourth height and the fourth height be higher than the third height, that the first display include a third display and a fourth display, that the first sound include a third sound and a fourth sound, that the display display a facial expression of the apparatus with both eyes and a mouth, that in a case where the distance thus calculated is longer than the third height corresponding to the material thus determined and in a case where the distance thus calculated is not longer than the fourth height corresponding to the material thus determined, the processor cause the display to perform the third display and cause the speaker to output the third sound, that in a case where the distance thus calculated is longer than the fourth height corresponding to the material thus determined, the processor cause the display to perform the fourth display and cause the speaker to output the fourth sound, that the third display show a confused facial expression, that the fourth display show a fearful facial expression, that the third sound request the user to move the apparatus to a lower height, and that the fourth sound raise an alarm.

According to this configuration, in a case where the apparatus has been moved in a vertical direction, when a distance from an object located directly underneath the apparatus to the apparatus is longer than the third height and not longer than the fourth height, a confused facial expression is displayed with both eyes and the mouth, and a sound is outputted that requests the user to move the apparatus to a lower height. On the other hand, when the distance is longer than the fourth height, a fearful facial expression is displayed with both eyes and the mouth, and a sound is outputted that raises an alarm.

This makes it possible to, by means of this display or sound, easily let the user know that the apparatus possibly gets damaged if it falls in a case where the distance is longer than the third height and not longer than the fourth height and in a case where the distance is longer than the fourth height. This also makes it possible to, by means of this display or sound, easily let the user know that the apparatus gets more damaged if it falls in a case where the distance is longer than the fourth height than in a case where the distance is longer than the third height and not longer than the fourth height.

Further, in the second aspect, the processor may further determine, with reference to a database storing a dialog history between the apparatus and the user, whether in a predetermined period of time before a present time in the dialog history the apparatus requested the user to move the apparatus upward in a vertical direction, and in a case where the processor has determined that the apparatus requested the user to move the apparatus upward in a vertical direction and in a case where the distance thus calculated is longer than the height corresponding to the material thus determined, the processor may cause the display to perform a fifth display and cause the speaker to output a fifth sound.

According to this configuration, even in a case where a distance from an object located directly underneath the apparatus to the apparatus is longer than a height, corresponding to a material of the object located directly underneath the apparatus, that possibly damages the apparatus if the apparatus falls, the fifth display is performed and the fifth sound is outputted when in the predetermined period of time before the present time the apparatus requested the user to move the apparatus upward in a vertical direction. For this reason, in a case where the user has performed an action of moving the apparatus upward in a vertical direction according to the request from the apparatus, a display or sound that refuses the action can be prevented from being outputted.

Further, in the second aspect, it is preferable that the fifth display show a smile and that the fifth sound express gratitude.

According to this configuration, even if the apparatus has a risk of possibly getting damaged if it falls in a case where the user has moved the apparatus in a vertical direction, a smile is displayed and a sound that expresses gratitude is outputted when in the predetermined period of time before the present time the apparatus requested the user to move the apparatus upward in a vertical direction. For this reason, in a case where the user has performed an action of moving the apparatus upward in a vertical direction according to the request from the apparatus, it is possible to easily let the user know that the apparatus expresses gratitude or appreciation for the action.

Further, a robot according to an aspect of the present disclosure is a robot that is moved by a user, including: a first sensor that detects a motion of and a moving direction of the robot; a third sensor that measures a distance to an object located directly underneath the robot; a camera that acquires a picture of an area around the robot; a processor; a display; and a speaker, wherein the processor determines, on the basis of a result of detection yielded by the first sensor, whether the robot has been moved in a vertical direction, in a case where the processor has determined that the robot has been moved in a vertical direction, the processor calculates, on the basis of a result of detection yielded by the third sensor, a distance from an object located directly underneath the robot to the robot, the processor determines, on the basis of a picture acquired from the camera, a material of the object located directly underneath the robot, the processor compares the distance thus calculated with a height corresponding to the material thus determined in a table showing a correspondence relationship between a material of an object and a height that possibly damages the robot if the robot falls onto the object, in a case where the distance thus calculated is longer than the height corresponding to the material thus determined, the processor causes the display to perform a first display and causes the speaker to output a first sound, and in a case where the distance thus calculated is not longer than the height corresponding to the material thus determined, the processor causes the display to perform a second display and causes the speaker to output a second sound.

According to this configuration, in a case where the robot has been moved in a vertical direction, when a distance from an object located directly underneath the robot to the robot is longer than a height, corresponding to a material of the object located directly underneath the robot, that possibly damages the robot if the robot falls, the first display is performed and the first sound is outputted. On the other hand, when a distance from an object located directly underneath the robot to the robot is not longer than a height, corresponding to a material of the object located directly underneath the robot, that possibly damages the robot if the robot falls, the second display is performed and the second sound is outputted.

For this reason, in a case where the robot has been moved in a vertical direction in a space where heights or materials of objects located directly underneath the robot vary according to two-dimensional positions of the robot, the user can be appropriately notified whether the robot possibly gets damaged if it falls, depending on a distance to an object located directly underneath the robot and a material of the object.

Further, a method according to an aspect of the present disclosure is a method for causing an apparatus that is moved by a user to express an emotion, the apparatus including a first sensor that detects a motion of and a moving direction of the apparatus, a third sensor that measures a distance to an object located directly underneath the apparatus, a camera that acquires a picture of an area around the apparatus, a display, and a speaker, the method including: determining, on the basis of a result of detection yielded by the first sensor, whether the apparatus has been moved in a vertical direction; in a case of having determined that the apparatus has been moved in a vertical direction, calculating, on the basis of a result of detection yielded by the third sensor, a distance from an object located directly underneath the apparatus to the apparatus; determining, on the basis of a picture acquired from the camera, a material of the object located directly underneath the apparatus; comparing the distance thus calculated with a height corresponding to the material thus determined in a table showing a correspondence relationship between a material of an object and a height that possibly damages the apparatus if the apparatus falls onto the object; in a case where the distance thus calculated is longer than the height corresponding to the material thus determined, causing the display to perform a first display and causing the speaker to output a first sound; and in a case where the distance thus calculated is not longer than the height corresponding to the material thus determined, causing the display to perform a second display and causing the speaker to output a second sound.

Further, the present disclosure discloses not only such a method for executing characteristic processes but also a program that causes the processor of the apparatus to execute the characteristic processes included in the method. Such a program can of course be distributed via a non-transitory computer-readable recording medium such as a CD-ROM or a communication network such as the Internet.

It should be noted that each of the embodiments to be described below shows an example of the present disclosure. The numerical values, shapes, constituent elements, steps, and orders of steps that are shown in the following embodiments are mere examples and are not intended to limit the present disclosure. Further, those of the constituent elements according to the following embodiments which are not recited in an independent claim representing the most generic concept are described as optional constituent elements. Further, the contents of each of the embodiments may be combined with the contents of the other embodiment.

First Embodiment

First, a robot 1 (apparatus) according to a first embodiment of the present disclosure is described. The robot 1 is moved by a user, for example, by being lifted or carried by the user. Further, the robot 1 is configured to be able to autonomously run on a floor or the like. Specifically, the robot 1 is constituted by a storage device (not illustrated), such as an HDD or an SSD, that has predetermined storage capacity, a driving mechanism that causes the robot 1 to run, a driving device that controls the driving mechanism, a communication device that performs communication with an external device via a network such as a wireless LAN or a communication network of a mobile information terminal carrier, a microcomputer, and the like. The microcomputer includes a CPU (processor), a ROM, a RAM, and the like and performs predetermined control by causing the CPU to execute a predetermined control program (program) stored in the ROM.

FIG. 1 is a block diagram showing an example of a functional configuration of the robot 1 according to the first embodiment of the present disclosure. As shown in FIG. 1, the robot 1 functions as a camera 101, an image processor 102, a sensor 103, a sensor information acquirer 104, a main controller 105, a speaker 106, an audio information output controller 107, a display 108, a display information output controller 109, a memory 110, a dialog history DB 111, a room map DB 112, a position dangerous height DB 113, a material dangerous height DB 114, and an expression DB 115.

The camera 101 is constituted by a camera that takes a still image or a video camera that takes a moving image, and acquires an image (picture) of an area around the robot 1. An angle from which the camera 101 takes an image is adjusted by the main controller 105. Note, however, that the first embodiment is configured such that the angle from which the camera 101 takes an image cannot be adjusted downward in a vertical direction of the robot 1 (hereinafter, to directly underneath).

The image processor 102, constituted by the microcomputer, estimates a relative position (two-dimensional position) of the robot 1 in each room on the basis of an image acquired by the camera 101 and room map information of each room as managed by the after-mentioned room map DB 112. The room map DB 112, the room map information, and the method for estimating a relative position of the robot 1 will be described later. Further, the image processor 102 performs a publicly-known image recognition process to identify, on the basis of an image of a floor and obstacles included in the image acquired by the camera 101, the materials and heights of the floor and each of the obstacles.

The sensor 103 is constituted by one or more sensors of, for example, a sensor (first sensor), such as an acceleration sensor or a gyro sensor, that detects the presence or absence of a movement (motion) of and the direction of movement (moving direction) of the robot 1, a sensor (second sensor), such as an acceleration sensor, that detects a movement distance in vertical direction of the robot 1, and a sensor (third sensor), such as an infrared distance sensor, that detects the distance from a floor or obstacle located directly underneath the robot 1 to the robot 1.

The first embodiment assumes that the sensor 103 is constituted by an acceleration sensor. That is, the first embodiment assumes that the sensor 103 is capable of detecting the presence or absence of a movement of and the direction of movement of the robot 1 and the movement distance in vertical direction of the robot 1 on the basis of the acceleration in horizontal direction and vertical direction of the robot 1 as detected by the acceleration sensor.

The sensor information acquirer 104, constituted by the microcomputer, determines, on the basis of information detected by the sensor 103, an action that the user has performed on the robot 1. Examples of actions that the user performs on the robot 1 include an action of lifting the robot 1, an action of carrying the robot 1, and an action of lowering the robot 1. An action that the user performs on the robot 1 will hereinafter be abbreviated to "user action".

The main controller 105, constituted by the microcomputer, controls the action of the robot 1. For example, the main controller 105 performs control that causes the robot 1 to run in a predetermined running direction, control that alters the emotional expression of the robot 1 according to the current position of the robot 1, and the like.

The speaker 106 is controlled by the audio information output controller 107 to convert an audio signal inputted thereto into a physical vibration and thereby output a sound represented by the audio signal.

The audio information output controller 107, constituted by the microcomputer, is controlled by the main controller 105 to generate an audio signal representing a predetermined speech text sentence and cause the speaker 106 to output the sound of the speech text sentence represented by the audio signal.

The display 108, constituted, for example, by a plurality of light-emitting diodes, is controlled by the display information output controller 109 to display display information representing a facial expression of the robot 1.

The display information output controller 109, constituted by the microcomputer, is controlled by the main controller 105 to cause the display 108 to output display information representing a predetermined facial expression. This allows the display 108 to display the facial expression of the robot 1 as represented by the display information.

The memory 110, constituted by a volatile storage device such as a RAM, stores various types of data, control programs, and the like for use in control of the robot 1.

The dialog history DB 111 is constituted by a nonvolatile storage device such as an HDD (hard disk drive) or an SSD (solid state drive). The dialog history DB 111 manages, as a dialog history, dialog information representing the contents of dialogs between the robot 1 and the user within a certain period of time (e.g. one day). The dialog information may be a text sentence representing the contents of a dialog between the robot 1 and the user or may be data into which an audio signal representing the contents of the dialog has been converted.

Figure 2:
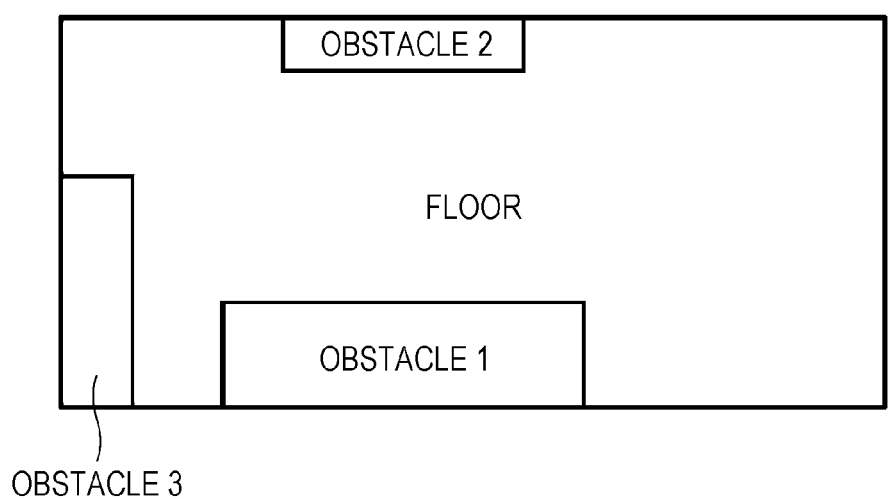
FIG. 2 is a diagram showing an example of first room map information.

The room map DB 112 is constituted by a nonvolatile storage device such as an HDD or an SSD. The room map DB 112 manages the room map information of each room. The room map information of each room is information indicating regions of placement of a floor and each obstacle (object) in a region representing that room. FIG. 2 shows an example of room map information that is managed by the room map DB 112. For example, the room map information shown in FIG. 2 illustrates regions of placement of an "obstacle 1" present near the center of the lower side of a rectangular region representing a room, an "obstacle 2" present near the center of the upper side of the rectangular region, and an "obstacle 3" present in the lower left corner of the rectangular region, and the remaining region is illustrated as a region of placement of the "floor". The room map information of each room is generated by the main controller 150 performing a publicly-known map creation process such as SLAM (simultaneous localization and mapping).

The position dangerous height DB 113 is constituted by a nonvolatile storage device such as an HDD or an SSD. FIG. 3 is a diagram showing an example of a position dangerous height table T3 (first table, second table). The position dangerous height DB 113 manages, with use of the position dangerous height table T3 shown in FIG. 3, information (hereinafter called "position dangerous height information") regarding the height that the robot 1 is above a floor or obstacle present in each room and located directly underneath the robot 1 and that the robot 1 possibly breaks down if it falls from onto the floor or obstacle.

Specifically, the position dangerous height information contains a room name X301, a position range X302, a material X303, a height X304, a dangerous height 1 X305, and a dangerous height 2 X306. The position dangerous height DB 113 manages the position dangerous height information by storing each of the pieces of information X301 to X306, which are contained in the position dangerous height information, in association with the other in the position dangerous height table T3.

The room name X301 is an identifier for identifying a room in which the robot 1 is present. The position range X302 is information indicating a region of placement of a floor or obstacle in a room. For example, in the case of a rectangular floor or obstacle, the position range X302 is constituted by four pieces of coordinate information representing relative positions (two-dimensional positions) of the four vertices of the floor or obstacle when any of the four corners of the room (e.g. the upper left corner) serves as a reference point.

The material X303 is an identifier of a material of a floor or obstacle in a room. The height X304 is the height of a floor or obstacle in a room. The height of a floor or obstacle in a room indicates the distance from the floor surface to the highest point in vertical direction of the floor or obstacle. For example, in the position dangerous height table T3 shown in FIG. 3, the height X304 of an obstacle whose material X303 is "sofa" is set at "30 cm", which is the distance from the floor surface to the highest point in vertical direction of the obstacle. Further, the height X304 of a floor whose material X303 is a material representing a floor such as "carpet" or "flooring" is set at "0 cm".

The dangerous height 1 X305 (first height) and the dangerous height 2 X306 (second height) are information indicating heights that the robot 1 is above a floor or obstacle of the material X303 located directly underneath the robot 1 and that the robot 1 possibly breaks down (possibly gets damaged) if it falls from onto the floor or obstacle.

The dangerous height 1 X305 indicates a height that the robot 1 is less likely to break down if it falls from, and the dangerous height 2 X306 indicates a height that the robot 1 is more likely to break down if it falls from. Therefore, the dangerous height 2 X306 is set to be higher than a height represented by the dangerous height 1 X305. For example, in the position dangerous height table T3 shown in FIG. 3, the dangerous height 2 X306 "60 cm" corresponding to a floor in a room identified by the room name X301 "living room" whose material X303 is "carpet" is set to be higher than the dangerous height 1 X305 by "30 cm".

That is, by finding a room in which the robot 1 is present and a relative position of the robot 1 in the room, a dangerous height 1 X305 and a dangerous height 2 X306 that, in the position dangerous height table T3, are associated with the room name X301 of the room and a position range X302 including the relative position can be acquired. A method for creating the position dangerous height table T3 will be described later.

The material dangerous height DB 114 is constituted by a nonvolatile storage device such as an HDD or an SSD. FIG. 4 is a diagram showing an example of a material dangerous height table T4 (table). The material dangerous height DB 114 manages, with use of the material dangerous height table T4 shown in FIG. 4, material dangerous height information associating the materials of floors and obstacles that may be present in rooms with information regarding the height that the robot 1 is above a floor or obstacle of such a material and that the robot 1 possibly breaks down if it falls from onto the floor or obstacle.

Specifically, the material dangerous height information contains a material X401, a dangerous height 1 X402, and a dangerous height 2 X403. The material dangerous height DB 114 manages the material dangerous height information by storing each of the pieces of information X401 to X403, which are contained in the material dangerous height information, in association with the other in the material dangerous height table T4.

The material X401 is an identifier of a material of a floor or obstacle that may be present in a room. The dangerous height 1 X402 and the dangerous height 2 X403 are information indicating heights that the robot 1 is above a floor or obstacle of the material X401 and that the robot 1 possibly breaks down if it falls from onto the floor or obstacle. The dangerous height 1 X402 (third height) indicates a height that the robot 1 is less likely to break down if it falls from, and the dangerous height 2 X403 (fourth height) indicates a height that the robot 1 is more likely to break down if it falls from. Therefore, the dangerous height 2 X403 is set to be higher than a height represented by the dangerous height 1 X402.

For example, in the material dangerous height table T4 shown in FIG. 4, the dangerous height 2 X403 "60 cm" corresponding to a floor whose material X401 is "carpet" is set to be higher than the dangerous height 1 X402 by "30 cm".

Figure 5:
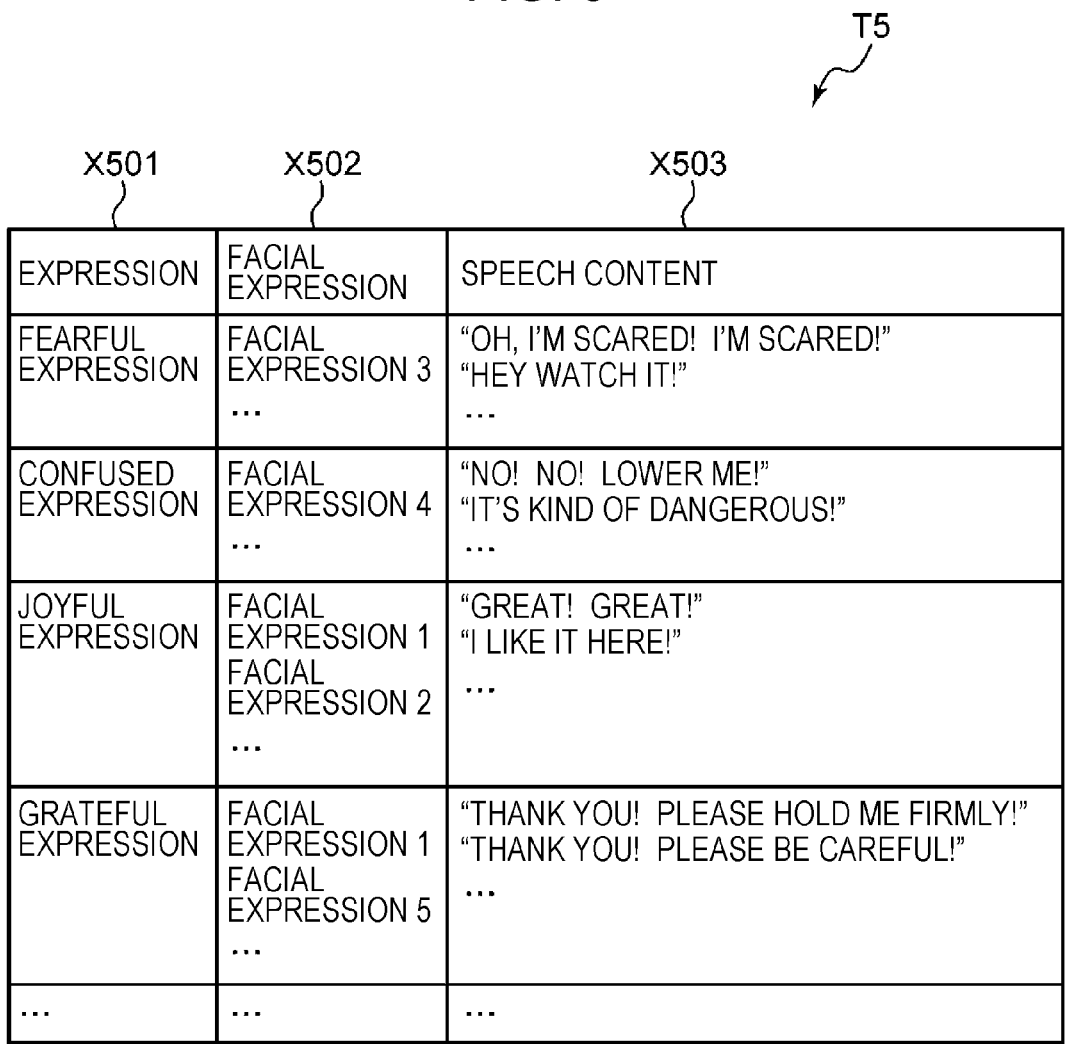
FIG. 5 is a diagram showing an example of an expression table.

The expression DB 115 is constituted by a nonvolatile storage device such as an HDD or an SSD. FIG. 5 is a diagram showing an example of an expression table T5. The expression DB 115 manages, with use of the expression table T5 shown in FIG. 5, expression information associating one or more facial expressions that the robot 1 may take on in a case of expressing emotions such as fear, confusion, joy, gratitude (hereinafter, making an emotional expression) with one or more speech text sentences respectively representing one or more contents that the robot 1 may speak of in a case of making the emotional expression.

Specifically, the expression information contains an expression X501, a facial expression X502, and a speech content X503. The expression DB 115 manages the expression information by storing each of the pieces of information X501 to X503, which are contained in the expression information, in association with the other in advance in the expression table T5.

The expression X501 is an identifier for identifying an emotional expression that the robot 1 makes. The facial expression X502 is an identifier of one or more expressions that the robot 1 may take on when making an emotional expression represented by the expression X501. The speech content X503 is one or more speech text sentences respectively representing one or more contents that the robot 1 may speak of when making an emotional expression represented by the expression X501.

For example, in a case of causing the robot 1 to make an emotional expression, the main controller 105 acquires an expression X502 and a speech content X503 that, in the expression table T5, are associated with an expression X501 corresponding to the emotion. Then, the main controller 105 selects one facial expression identifier from among one or more facial expression identifiers included in the facial expression X502 thus acquired and selects one speech text sentence from among one or more speech text sentences included in the speech content X503 thus acquired. The main controller 105 may select one facial expression identifier and one speech text sentences such as these for example either randomly or in a predetermined order.

Then, the main controller 105 controls the display information output controller 109 (FIG. 1) to cause the display 108 to output display information representing a facial expression identified by the one facial expression identifier thus selected. Further, the main controller 105 controls the audio information output controller 107 (FIG. 1) to cause it to generate an audio signal representing the one speech text sentence thus selected and cause the speaker 106 to output the sound of the speech text sentence represented by the audio signal.

For example, in a case of causing the robot 1 to make an expression represented by the expression X501 "fearful expression" in the expression table T5 shown in FIG. 5, the main controller 105 selects the facial expression X502 "facial expression 3" and the speech content X503 "Oh, I'm scared! I'm scared!", which are associated with the expression X501 "fearful expression" in the expression table T5. Then, the main controller 105 controls the display information output controller 109 to cause the display 108 to output display information representing the facial expression X502 "facial expression 3" and controls the audio information output controller 107 (FIG. 1) to cause the speaker 106 to output the sound of the speech content X503 "Oh, I'm scared! I'm scared!". Overall Operation of Control That Alters Emotional Expression of Robot 1

Figure 6:
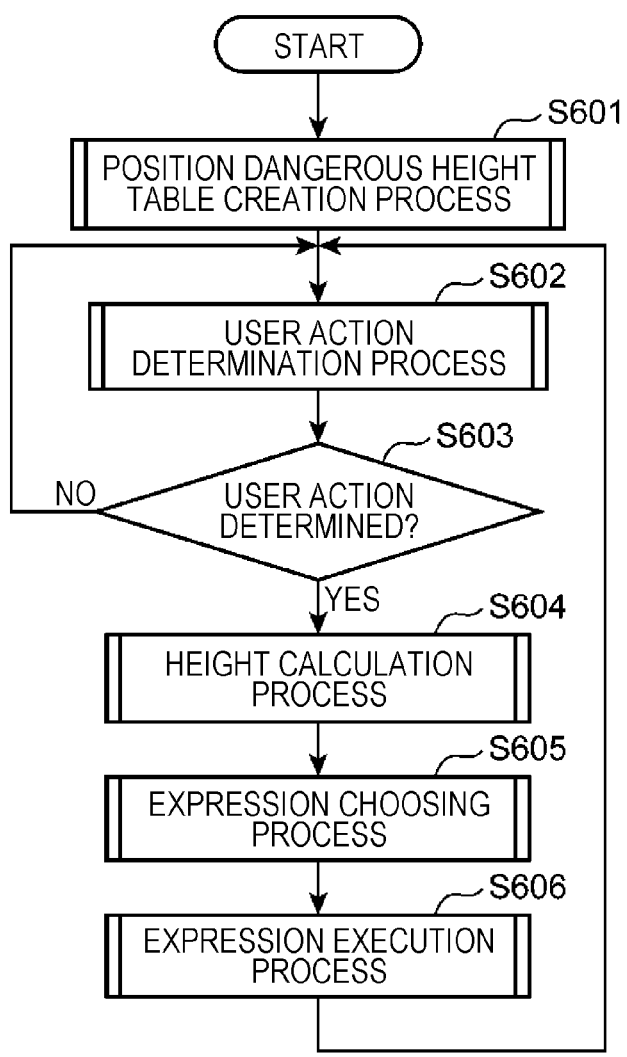
FIG. 6 is a flow chart showing an example of control that alters the emotional expression of the robot according to the first embodiment of the present disclosure.

The following describes an overall operation of control in which the main controller 105 alters the emotional expression of the robot 1 according to the current position of the robot 1 in the first embodiment. FIG. 6 is a flow chart showing an example of control that alters the emotional expression of the robot 1 according to the first embodiment of the present disclosure.

As shown in FIG. 6, first, the main controller 105 creates the position dangerous height table T3 (step S601). Next, the sensor information acquirer 104 determines a user action on the basis of information acquired from the sensor 103 (step S602).

Once the user action is determined in step S602 (YES in step S603), the main controller 105 calculates a height from a floor or obstacle located directly underneath the robot 1 to the robot 1 (step S604). In a case where the user action has not been determined in step S602 (NO in step S603), the process returns to step S602.

After step S604, the main controller 105 executes an expression choosing process in step S605 (step S605). In the expression choosing process of step S605, the main controller 105 chooses, on the basis of a result of a comparison between the height from the robot 1 to the floor or obstacle located directly underneath the robot 1 as calculated in step S604 and dangerous heights corresponding to a relative position of the robot 1 in each room, an emotional expression that the main controller 105 causes the robot 1 to make. The dangerous heights corresponding to a relative position of the robot 1 in each room indicate a dangerous height 1 X305 and a dangerous height 2 X306 that, in the position dangerous height table T3 (FIG. 3), are associated with a room name X301 matching the identifier of the room in which the robot 1 is present and a position range X302 including coordinate information indicating the relative position of the robot 1 in the room.

Next, the main controller 105 executes an expression execution process in step S606 (step S606). In step S606, the main controller 105 decides whether to cause the robot 1 to make the emotional expression chosen in step S605. Then, in a case where the main controller 105 has decided to cause the robot 1 to make the emotional expression, the main controller 105 causes the robot 1 to make the emotional expression. On the other hand, in a case where the main controller 105 has decided not to cause the robot 1 to make the emotional expression, the main controller 105 does not cause the robot 1 to make the emotional expression.

After step S606, the process returns to step S602, and step S602 and subsequent steps are repeated.
Details of Process of Creating Position Dangerous Height Table T3 (FIG. 3)

Figure 7:
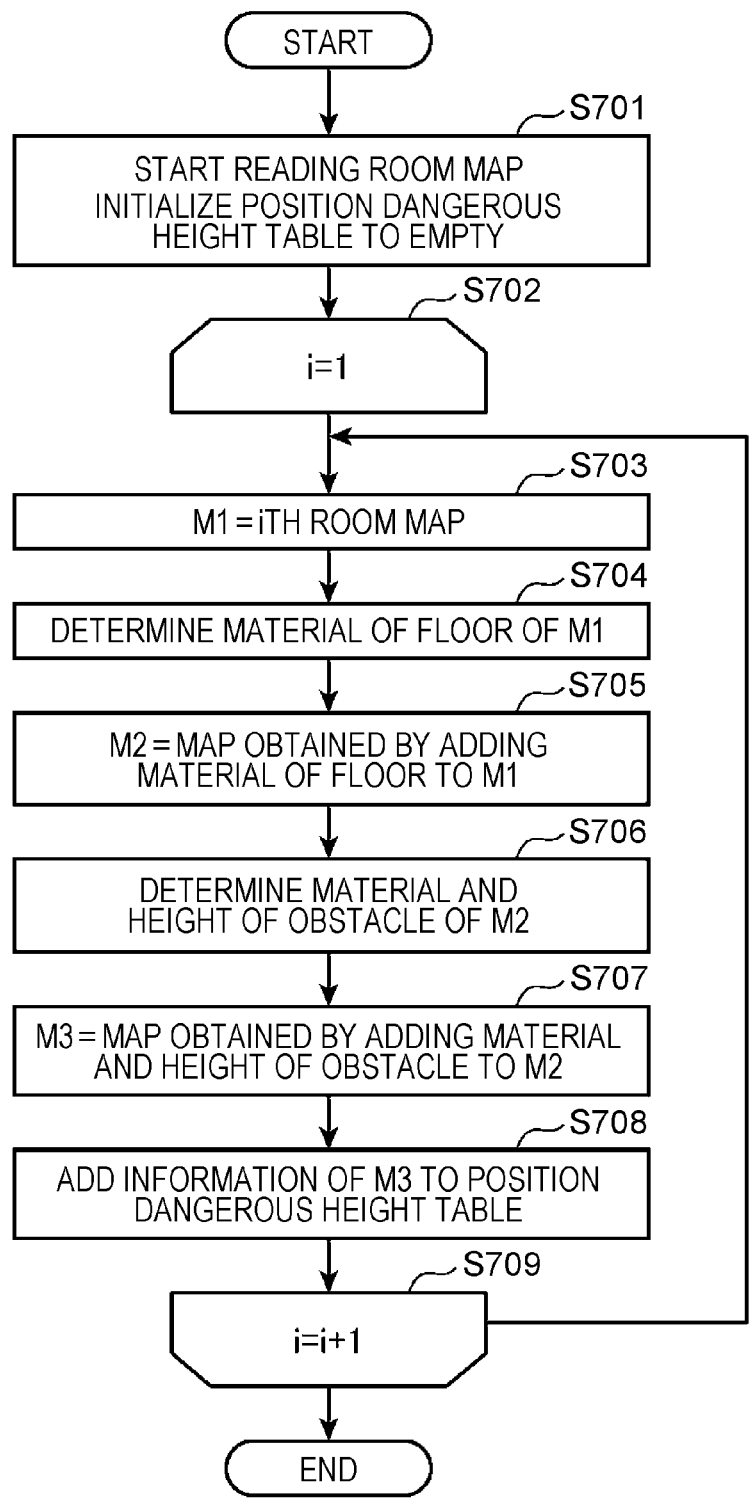
FIG. 7 is a flow chart showing an example of a process of creating a position dangerous height table.

The following describes the details of each process in the overall flow chart. First, details of the process of creating the position dangerous height table T3 (FIG. 3) in step S601 are described. FIG. 7 is a flow chart showing an example of the process of creating the position dangerous height table T3.

As shown in FIG. 7, first, at the start of the process of creating the position dangerous height table T3, the main controller 105 sequentially stores, in the memory 110, the room map information of each room (such as a living room and a bedroom) as managed by the room map DB 112. Further, the main controller 105 causes the position dangerous DB 113 to erase all position dangerous information stored in the position dangerous height table T3 (FIG. 3). By so doing, the main controller 105 initializes the position dangerous height table T3 (step S701).

Next, the main controller 105 initializes a variable i (step S702) and executes steps S703 to S709.

In step S703, the main controller 105 reads out, from the memory 110, the ith room map information (FIG. 2) stored in the memory 110 and configures this information as first room map information M1.

Next, the main controller 105 determines the material of a floor of a room corresponding to the first room map information M1 (step S704). Specifically, in step S704, while causing the robot 1 to run, for example, by causing the driving device to control the driving mechanism, the main controller 105 causes the camera 101 to acquire an image of the area around the robot 1. Then, the main controller 105 performs a publicly-known image recognition process on the image thus acquired and thereby determines the material of the floor included in the image.

In a case where the main controller 105 cannot determine the material of the floor from the image of the floor as acquired by the camera 101, the main controller 105 may perform communication via the communication device with an external device, such as a smartphone, that the user operates and acquire the material of the floor as inputted by the user via the external device.

Then, the main controller 105 adds, to the first room map information M1, information indicating the material of the floor as determined in step S704 and configures this information as second room map information M2 (step S705). In a case where the main controller 105 has determined in step S704 that the floor of the room is composed of plural types of material, the main controller 105 executes step S705 in such a way as to add, to the first room map information M1, an image showing a floor region of each type of material.

Figure 8:
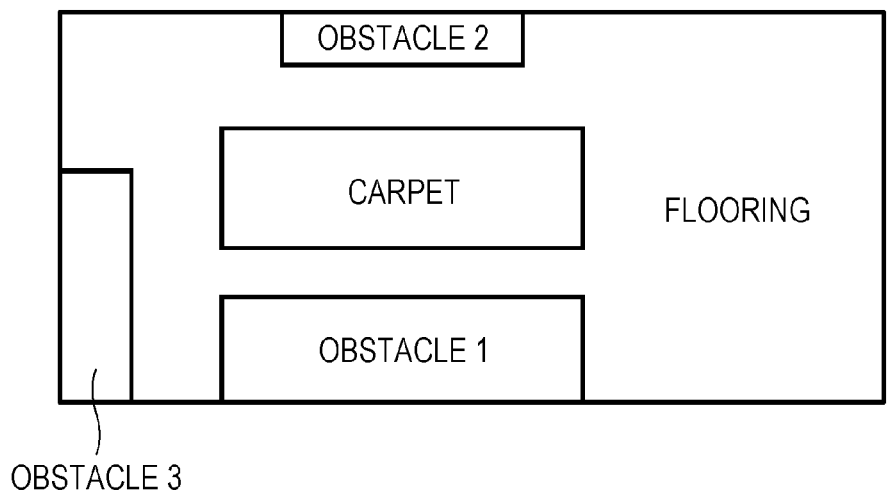
FIG. 8 is a diagram showing an example of second room map information.

FIG. 8 is a diagram showing an example of the second room map information M2. Assume, for example, that the first room map information M1 is the room map information shown in FIG. 2. Assume also that the main controller 105 has determined in step S704 that the material of a rectangular floor region near the central part of the room is a carpet and the material of the other floor region is flooring.

In this case, as shown in FIG. 8, the main controller 105 adds a rectangular image representing the rectangular floor region to the vicinity of the central part of the room in the first room map information M1 (FIG. 2) and adds the material "carpet" of the rectangular floor to the inside of the rectangular image. Furthermore, as shown in FIG. 8, the main controller 105 adds the material "flooring" of the floor to the inside of an image representing the other floor region in the first room map information M1 (FIG. 2).

Next, the main controller 105 determines the material of each obstacle present in the room corresponding to the second room map information M2 and the height of that obstacle (step S706). Specifically, in step S706, as in step S704, while causing the robot 1 to run, for example, by causing the driving device to control the driving mechanism, the main controller 105 causes the camera 101 to acquire an image of the area around the robot 1. Then, the main controller 105 performs a publicly-known image recognition process on the image thus acquired and thereby determines the material and height of each obstacle included in the image.

In a case where the main controller 105 cannot determine the material and height of an obstacle from an image of an obstacle as acquired by the camera 101, the main controller 105 may perform communication via the communication device with an external device, such as a smartphone, that the user operates and acquire the material and height of each obstacle as inputted by the user via the external device. Further, in step S706, the main controller 105 may determine the type of object (such as sofa, television, or bookshelf) of an obstacle as the material of the obstacle.

Then, the main controller 105 adds, to the second room map information M2, information indicating the material and height of an obstacle as determined in step S706 and configures this information as third room map information M3 (step S707).

Figure 9:
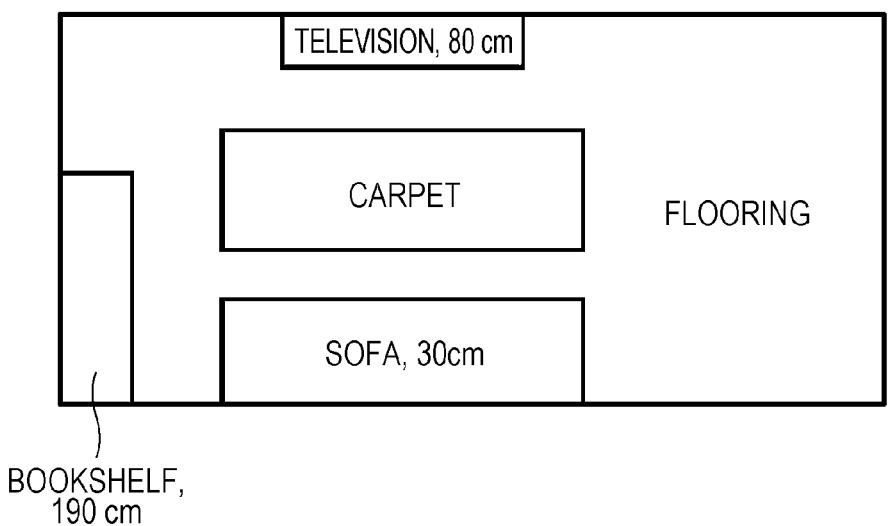
FIG. 9 is a diagram showing an example of third room map information.

FIG. 9 is a diagram showing an example of the third room map information M3. Assume, for example, that the second room map information M2 is the room map information shown in FIG. 8. Assume also that the main controller 105 has determined in step S706 that the material and height of the "obstacle 1" present near the center of the lower side of the rectangular region representing the room are "sofa" and "30 cm", respectively, that the material and height of the "obstacle 2" present near the center of the upper side of the rectangular region are "television" and "80 cm", respectively, and the material and height of that the "obstacle 3" present in the lower left corner of the rectangular region are "bookshelf" and "190 cm", respectively.

In this case, as shown in FIG. 9, the main controller 105 adds the material "sofa" and the height "30 cm" of the "obstacle 1" to the inside of an image showing a region of placement of the "obstacle 1" in the second room map information M2 (FIG. 8), adds the material "television" and the height "80 cm" of the "obstacle 2" to the inside of an image showing a region of placement of the "obstacle 2", and adds the material "bookshelf" and the height "190 cm" of the "obstacle 3" to the inside of an image showing a region of placement of the "obstacle 3".

Next, the main controller 105 adds, to the position dangerous height table T3 (FIG. 3), information added to the regions of placement of the floor and the obstacles of the third room map information M3 and indicating the materials and heights of the floor and the obstacles (step S708).

Specifically, in step S708, the main controller 105 stores, in the room name X301 of the position dangerous height table T3 (FIG. 3), the identifier of the room corresponding to the third room map information M3, i.e. the identifier of the room corresponding to the ith room map information (FIG. 2) read out from the memory 110 in step S703.

The main controller 105 stores, in the position range X302, coordinate information indicating the regions of placement of the floor and each of the obstacles included in the third room map information M3. For example, in a case where the region of placement of the floor is rectangular, the main controller 105 stores four pieces of coordinate information indicating relative positions of the four vertices of the region of placement of the floor when any of the four corners of the room with respect to the third room map information M3 serves as a reference point.

The main controller 105 stores, in the material X303, the identifiers of the materials of the floor and each of the obstacles included in the third room map information M3 and stores, in the height X304, the heights of the floor and each of the obstacles. In a case where the third room map information includes the identifier of the material (such as flooring or carpet) of the floor, the main controller 105 stores "0 cm" in the height X304 of an object of the material.

The main controller 105 stores, in the dangerous height 1 X305 and the dangerous height 2 X306, a dangerous height 1 X402 (e.g. "30 cm") and a dangerous height 2 X403 (e.g. "60 cm") that, in the material dangerous height table T4 (FIG. 4), are associated with a material X401 matching the material X303 (e.g. "carpet"), respectively.

After step S708, the main controller 105 increments the variable i by 1 (step S709) and repeats step S703 and subsequent steps. In this way, the main controller 105 sequentially adds the position dangerous height information (X301 to X306) to the position dangerous height table T3 (FIG. 3) on the basis of the first room map information M1 of each room as managed by the room map DB 112.

Details of Process of Determining User Action

Figure 10:
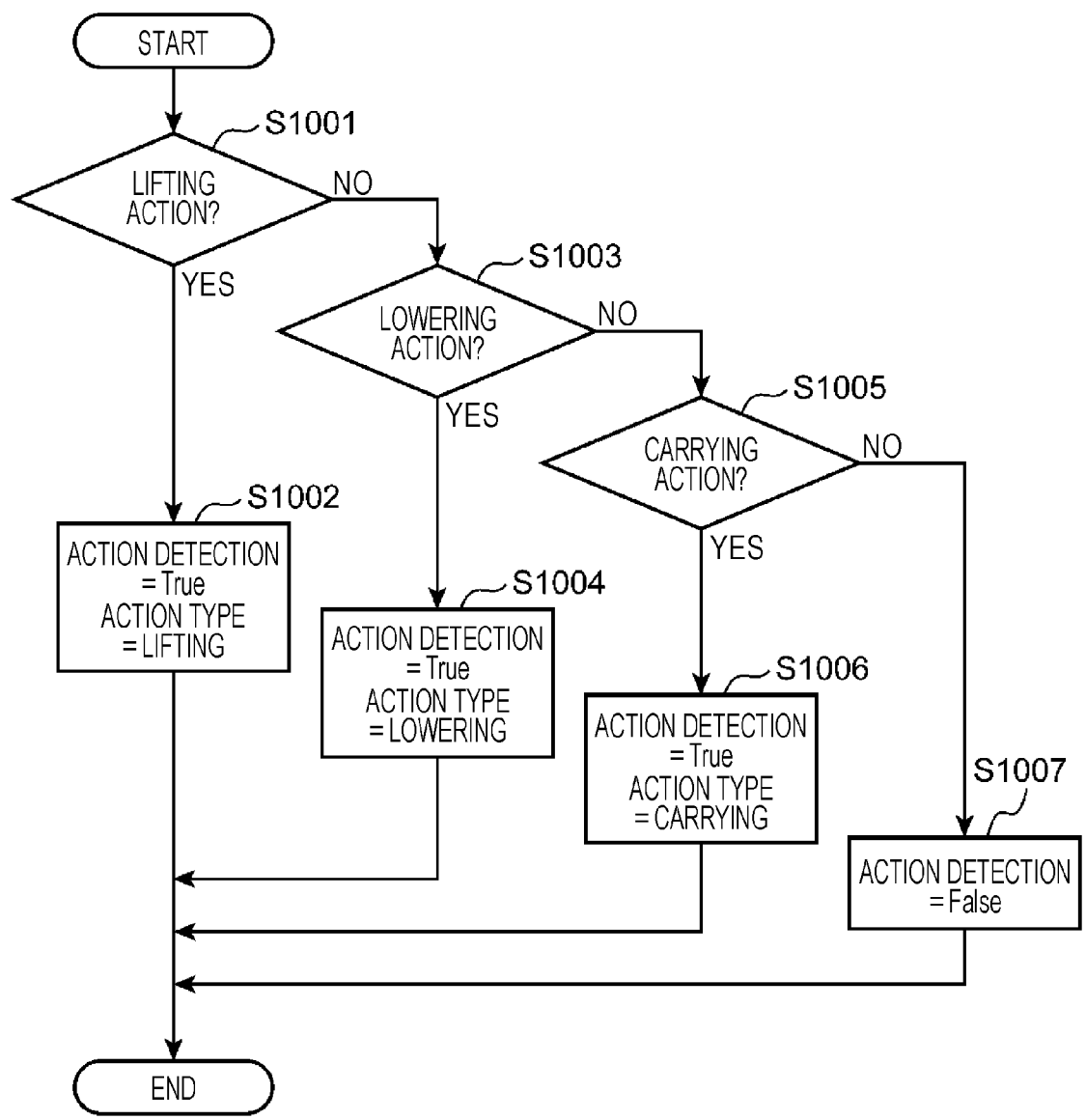
FIG. 10 is a flow chart showing an example of a user action determination process.

The following describes the details of the process (hereinafter called "user action determination process") of determining a user action in step S602 (FIG. 6). FIG. 10 is a flow chart showing an example of the user action determination process.

As shown in FIG. 10, first, at the start of the user action determination process, the sensor information acquirer 104 determines whether the user has performed an action of lifting the robot 1 (or has moved the robot 1 in a vertical direction) (step S1001).

Specifically, in step S1001, the sensor 103 detects an upward movement of the robot 1 in a vertical direction when the acceleration (hereinafter, acceleration in Z-axis direction) of the robot 1 upward in a vertical direction as detected by the acceleration sensor constituting the sensor 3 becomes equal to or higher than a positive first threshold. In this case, the sensor information acquirer 104 determines that the user has performed an action of lifting the robot 1 (YES in step S1001).

In this case, the sensor information acquirer 104 sets an action detection flag, which indicates whether a determination of a user action has ended, to True, which indicates that a determination of a user action has ended, and sets the type of the user action to "lifting" (step S1002).

On the other hand, in a case where the acceleration in Z-axis direction of the robot 1 is not equal to or higher than the first threshold, the sensor 103 does not detect an upward movement of the robot 1 in a vertical direction. In this case, the sensor information acquirer 104 determines that the user has not performed an action of lifting the robot 1 (NO in step S1001), and determines whether the user has performed an action of lowering the robot 1 (or has moved the robot 1 in a vertical direction) (step S1003).

Specifically, in step S1003, the sensor 103 detects a downward movement of the robot 1 in a vertical direction when the acceleration in Z-axis direction of the robot 1 as detected by the acceleration sensor becomes equal to or lower than a negative second threshold. In this case, the sensor information acquirer 104 determines that the user has performed an action of lowering the robot 1 (YES in step S1003). In this case, the sensor information acquirer 104 sets the action detection flag to True and sets the type of the user action to "lowering" (step S1004).

On the other hand, in a case where the acceleration in Z-axis direction of the robot 1 is not equal to or lower than the second threshold, the sensor 103 does not detect a downward movement of the robot 1 in a vertical direction. In this case, the sensor information acquirer 104 determines that the user has not performed an action of lowering the robot 1 (NO in step S1003), and determines whether the user has performed an action of carrying the robot 1 (or has moved the robot 1 in a horizontal direction) (step S1005).

Specifically, in step S1005, the sensor 103 detects a movement of the robot 1 in a horizontal direction when the absolute value of the acceleration (hereinafter, acceleration in X-axis direction) of the robot 1 in a horizontal direction and a forward direction as detected by the acceleration sensor or the absolute value of the acceleration (hereinafter, acceleration in Y-axis direction) of the robot 1 in a horizontal direction and a transverse direction (direction orthogonal to the forward direction) becomes equal to or higher than a predetermined third threshold. In this case, the sensor information acquirer 104 determines that the user has performed an action of carrying the robot 1 (YES in step S1005), sets the action detection flat to True, and sets the type of the user action to "carrying" (step S1006).

On the other hand, in a case where the absolute values of the acceleration in X-axis direction and Y-axis direction of the robot 1 are both not equal to or higher than the third threshold, the sensor 103 does not detect a movement of the robot 1 in a horizontal direction. In this case, the sensor information acquirer 104 determines that the user has not performed an action of lowering the robot 1 (NO in step S1005), and sets the action detection flag to False, which indicates that a determination of a user action has not ended (step S1007).

Details of Process of Calculating Height at which Robot 1 is

Figure 11:
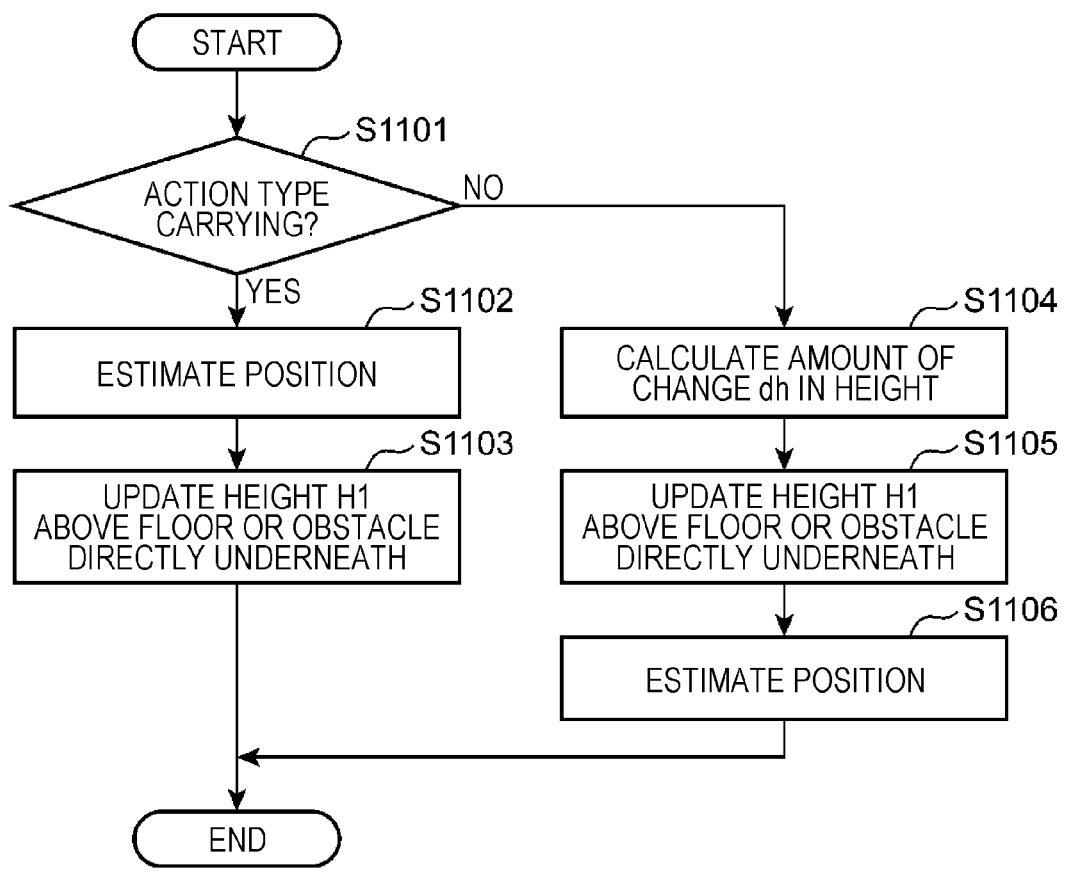
FIG. 11 is a flow chart showing an example of a height calculation process according to the first embodiment of the present disclosure.

The following describes the details of the process (hereinafter called "height calculation process") in step S604 (FIG. 6) of calculating the height at which the robot 1 is. FIG. 11 is a flow chart showing an example of the height calculation process according to the first embodiment of the present disclosure.

As shown in FIG. 11, first, at the start of the height calculation process, the main controller 105 determines whether the type of a user action as set in the user action determination process of step S602 (FIG. 6) is "carrying" (step S1101).

In a case where the type of the user action is not "carrying" (NO in step S1101), the main controller 105 determines that the user has performed an action of lifting or lowering the robot 1 and moved the robot 1 in a vertical direction. In this case, since the distance at which the robot 1 is spaced upward in a vertical direction from a floor or obstacle located directly underneath the robot 1 (distance from an object located directly underneath the apparatus (robot) to the apparatus (robot)) H1 has changed, the main controller 105 calculates an amount of change dh in the distance H1 (step S1104). The distance H1 at which the robot 1 is spaced upward in a vertical direction from a floor or obstacle located directly underneath the robot 1 will hereinafter be referred to as "height H1 that the robot 1 is above a floor or obstacle".

Specifically, in a period of time from the start to completion of the user's action of lifting or lowering the robot 1, the main controller 105 calculates a distance of movement of the robot 1 in a vertical direction by integrating twice the acceleration in Z-axis direction as detected by the acceleration sensor constituting the sensor 103 (FIG. 1) and gives this distance as the amount of change dh. The period of time from the start to completion of the user's action of lifting the robot 1 is a period of time it takes for the acceleration in Z-axis direction as detected by the acceleration sensor to change from 0 to a positive predetermined threshold or below. The period of time from the start to completion of the user's action of lowering the robot 1 is a period of time it takes for the acceleration in Z-axis direction as detected by the acceleration sensor to change from 0 to a negative predetermined threshold or above.

Next, the main controller 105 updates the height H1 that the robot 1 is above a floor or obstacle to "H1+dh" by adding the amount of change dh calculated in step S1104 to the height H1 that the robot 1 is above a floor or obstacle (step S1105). In a case where, at the start of step S1105, the height H1 that the robot 1 is above a floor or obstacle has not been initialized, the main controller 105 adds the amount of change dh to the height H1 after having initialized the height H1 to "0 cm".

Next, the main controller 105 controls the image processor 102 to cause it to estimate the relative position of the robot 1 in the room on the basis of an image acquired by the camera 101 and the room map information of each room as managed by the room map DB 112 (step S1106).

Specifically, in step S1106, the image processor 102 executes a publicly-known image recognition process to make a comparison between a region of placement of a floor or obstacle included in the image acquired by the camera 101 and a region of placement of a floor or obstacle included in the room map information of each room as managed by the room map DB 112. As a result of the comparison, the image processor 102 identifies room map information in which a floor or obstacle is placed in the same region of placement as the floor or obstacle included in the image acquired by the camera 101. Then, the image processor 102 determines that the robot 1 is present in a room corresponding to the room map information thus identified.

Then, the image processor 102 executes a publicly-known image recognition process to calculate coordinate information representing the relative position of the robot 1 in the room, for example, from the distances between the four corners of the room, the floor, and the obstacles included in the image acquired by the camera 101 and a predetermined reference point such as the center of the image acquired by the camera 101.

By so doing, the image processor 102 estimates that the robot 1 is present at the relative position represented by the coordinate information thus calculated in the room thus identified, and outputs the identifier of the room thus identified and the coordinate information thus calculated to the main controller 105.

On the other hand, in a case where the type of the user action is "carrying" (YES in step S1101), the main controller 105 causes the image processor 102 to estimate the relative position of the robot 1 in the room as in step S1106 (step S1102).

In a case where the user has performed an action of carrying the robot 1, a different floor or obstacle comes to directly underneath the robot 1, so that there may be a change in the height H1 that the robot 1 is above a floor or obstacle. For this reason, after step S1102, the main controller 105 updates the height H1 that the robot 1 is above a floor or obstacle on the basis of the height (hereinafter called "previous height") of the floor or obstacle located directly underneath the robot 1 before the user performed the action of carrying the robot 1 and the height of the floor or obstacle currently located directly underneath the robot 1 (step S1103).

Specifically, in step S1103, the main controller 105 acquires, from the image processor 102, the identifier of the room in which the robot 1 is present and the coordinate information indicating the relative position of the robot 1 in the room, which represent the relative position of the robot 1 as estimated by the image processor 102 in step S1102.

Then, the main controller 105 acquires a material X303 (e.g. "sofa") and a height X304 (e.g. "30 cm") that, in the position dangerous height table T3 (FIG. 3), are associated with a room name X301 matching the identifier (e.g. "living room") thus acquired of the room in which the robot 1 is present and a position range X302 including the coordinate information thus acquired.

Then, in a case where the material X303 (e.g. "sofa") thus acquired is different from the material (hereinafter called "previous material") (e.g. "carpet"), stored in the memory 110 (FIG. 1), of the floor or obstacle located directly underneath the robot 1 before the user performed the action of carrying the robot 1 and in a case where no previous material has been stored in the memory 110 (FIG. 1), the main controller 105 determines that a different floor or obstacle has come to directly underneath the robot 1.

In this case, the main controller 105 subtracts the previous height (e.g. "0 cm") stored in the memory 110 (FIG. 1) from the height X304 (e.g. "30 cm") acquired from the aforementioned position dangerous height table T3 (FIG. 3). Then, the main controller 105 determines that the height H1 that the robot 1 is above a floor or obstacle has become lower than before the user action by the height dH (e.g. "30 cm") represented by the result of the subtraction and, according to the result of subtracting the height dH represented by the result of the subtraction from the height H1 that the robot 1 is above a floor or obstacle, updates the height H1 that the robot 1 is above a floor or obstacle (H1=H1−dH).

On the other hand, in a case where the material X303 (e.g. "sofa") acquired from the position dangerous height table T3 (FIG. 3) matches the previous material stored in the memory 110 (FIG. 1), the main controller 105 determines that no different floor or obstacle has come to directly underneath the robot 1, and does not update the height H1 that the robot 1 is above a floor or obstacle.

Then, the main controller 105 stores the material X303 (e.g. "sofa") and the height X304 (e.g. "30 cm"), which have been acquired from the aforementioned position dangerous height table T3 (FIG. 3), as the previous material and the previous height in the memory 110 (FIG. 1).

Details of Expression Choosing Process

Figure 12:
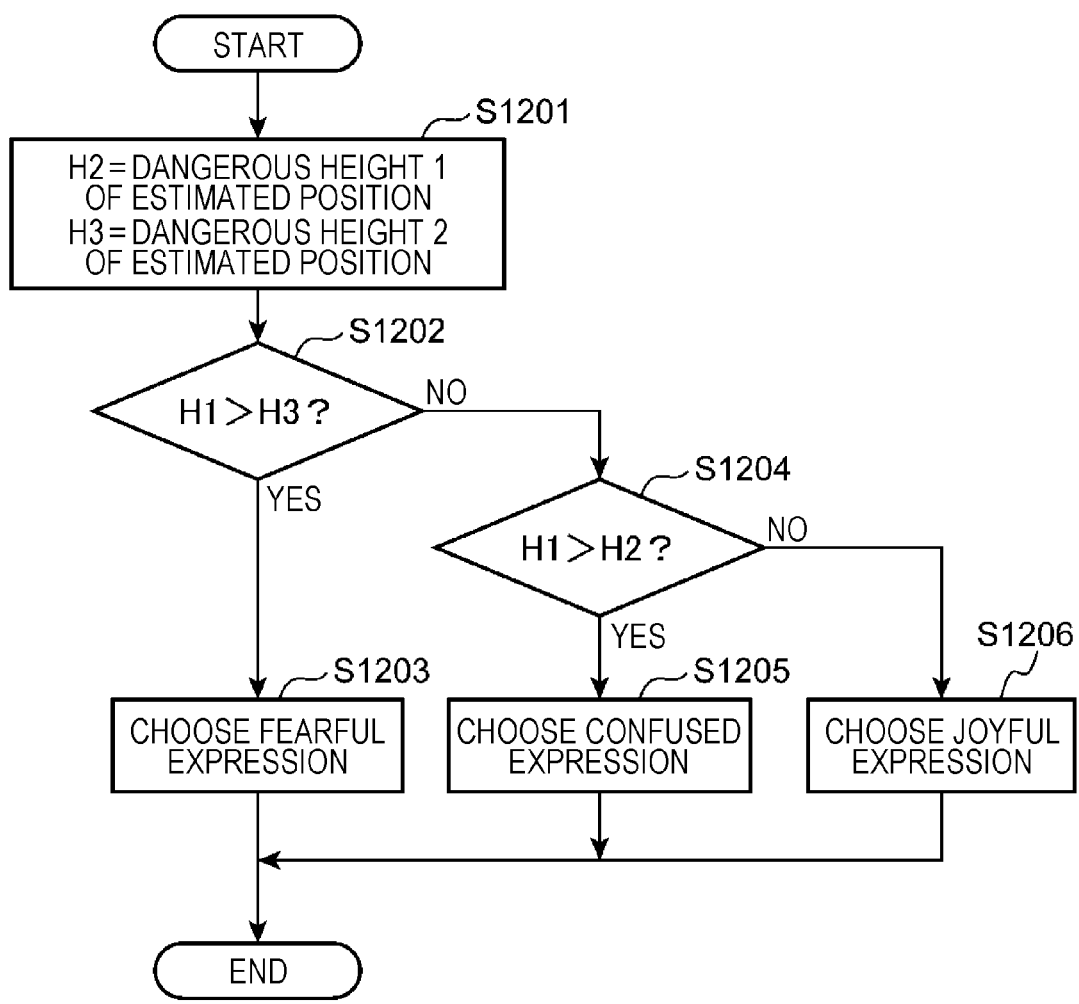
FIG. 12 is a flow chart showing an example of an expression choosing process according to the first embodiment of the present disclosure.

The following describes the details of the expression choosing process in step S605 (FIG. 6). FIG. 12 is a flow chart showing an example of the expression choosing process according to the first embodiment of the present disclosure. As shown in FIG. 12, first, at the start of the expression choosing process, the main controller 105 acquires a dangerous height 1 X305 and a dangerous height 2 X306 (heights corresponding to a two-dimensional position) that, in the position dangerous height table T3 (FIG. 3), are associated with a room name X301 matching the identifier of the room in which the robot 1 is present as estimated in step S1102 or S1106 (FIG. 11) and a position range X302 including the coordinate information indicating the relative position of the robot 1 in the room as estimated in the same step. Then, the main controller 105 sets the dangerous height 1 X305 thus acquired as a variable H2 (H2=Dangerous Height 1 X305) and sets the dangerous height 2 X306 thus acquired as a variable H3 (H3=Dangerous Height 2 X306) (step S1201).

Next, the main controller 105 compares the height H1 that the robot 1 is above a floor or obstacle updated in step S1103 or S1105 (FIG. 11) with the variable H3 set in step S1201 (step S1202). In a case where the height H1 that the robot 1 is above a floor or obstacle is greater than the variable H3 (YES in step S1202), the main controller 105 determines that the robot 1 is currently more likely to break down if it falls, and chooses a "fearful expression" as the emotional expression that the main controller 105 causes the robot 1 to make (step S1203). The "fearful expression" is an emotional expression that is identified by the expression X501 "fearful expression" in the expression table T5 (FIG. 5).

In a case where the height H1 that the robot 1 is above a floor or obstacle is not greater than the variable H3 (NO in step S1202), the main controller 105 compares the height H1 that the robot 1 is above a floor or obstacle with the variable H2 set in step S1201 (step S1204). In a case where the height H1 that the robot 1 is above a floor or obstacle is greater than the variable H2 (YES in step S1204), the main controller 105 determines that the robot 1 is currently likely to break down if it falls, and chooses a "confused expression" as the emotional expression that the main controller 105 causes the robot 1 to make (step S1205). The "confused expression" is an emotional expression that is identified by the expression X501 "confused expression" in the expression table T5 (FIG. 5).

In a case where the height H1 that the robot 1 is above a floor or obstacle is not greater than the variable H2 (NO in step S1204), the main controller 105 determines that the robot 1 is currently unlikely to break down even if it falls, and chooses a "joyful expression" as the emotional expression that the main controller 105 causes the robot 1 to make (step S1206). The "joyful expression" is an emotional expression that is identified by the expression X501 "joyful expression" in the expression table T5 (FIG. 5).

Details of Expression Execution Process

Figure 13:
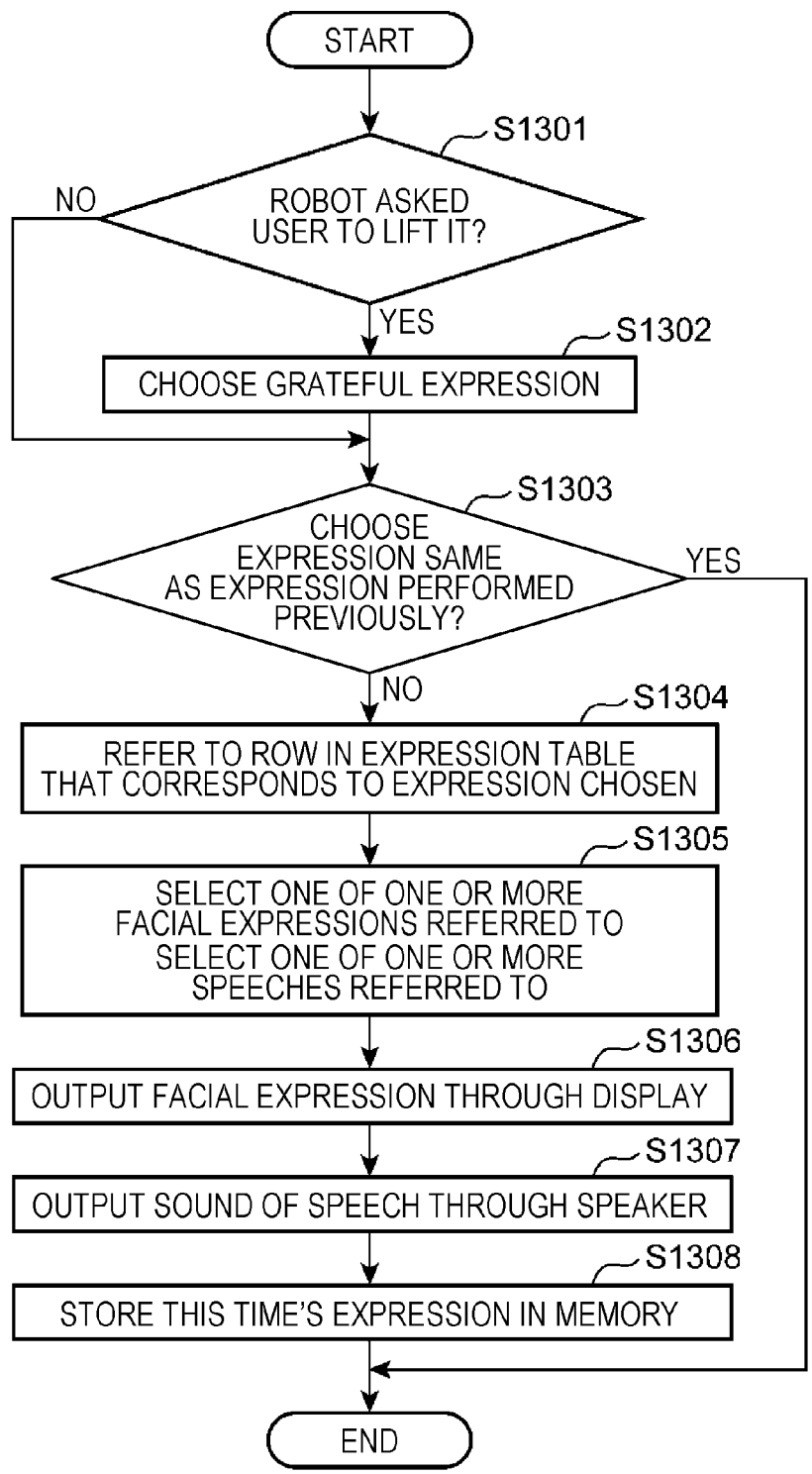
FIG. 13 is a flow chart showing an example of an expression execution process.

The following describes the details of the expression execution process in step S606 (FIG. 6). FIG. 13 is a flow chart showing an example of the expression execution process. As shown in FIG. 13, first, at the start of the expression execution process, the main controller 105 judges, with reference to dialog information managed by the dialog history DB 111 and representing the contents of dialogs carried out within the most recent predetermined period of time (e.g. ten minutes), whether the robot 1 has carried out a dialog to the effect that the robot 1 asks the user to lift it (step S1301).

For example, the robot 1 is configured to operate on electric power stored in a secondary battery. In a case where there is an insufficiency of electric power on which the robot 1 operates or in a similar case, the main controller 105 controls the audio information output controller 107 to cause the speaker 106 to output a sound to the effect that the robot 1 requests the user to hold it. This allows the robot 1 and the user to carry out a dialog to the effect that the robot 1 asks the user to lift it. In this case, the dialog history DB 111 manages, as a dialog history, dialog information indicating the sound to the effect the robot 1 requests the user to hold it.

In a case where the main controller 105 has determined that a dialog has been carried out to the effect that the robot 1 asks the user to lift it (YES in step S1301), the main controller 115 chooses a "grateful expression" instead of the emotional expression chosen in the expression choosing process (FIG. 12) as the emotional expression that the main controller 105 causes the robot 1 to make (step S1302). The "grateful expression" is an emotional expression that is identified by the expression X501 "grateful expression" in the expression table T5 (FIG. 5).

That is, in a case where the main controller 105 has determined that a dialog has been carried out to the effect that the robot 1 asks the user to lift it (YES in step S1301), the main controller 105 chooses the grateful expression as the emotional expression that the main controller 105 causes the robot 1 to make, even in a case where the height H1 that the robot 1 is above a floor or obstacle is greater than the variable H2 (YES in S1204 or YES in S1202).

On the other hand, in a case where the main controller 105 has determined that no dialog has been carried out to the effect that the robot 1 asks the user to lift it (NO in step S1301) and in a case where the main controller 105 has executed step S1302, the main controller 105 determines whether the emotional expression that the main controller 105 causes the robot 1 to make is the same expression as the emotional expression that the main controller 105 previously caused the robot 1 to make and the main controller 105 has caused the robot 1 to make the same emotional expression as the previous one within the most recent certain period of time (e.g. within one hour) (step S1303).

Specifically, in the after-mentioned step S1308, the main controller 105 stores, in the memory 110 (FIG. 1), an identifier (e.g. "fearful expression") that identifies an emotional expression that the robot 1 previously made and the date and time at which the robot 1 made the emotional expression. Accordingly, in step S1303, the main controller 105 makes the determination with reference to an identifier that identifies an emotional expression, stored in the memory 110, that the robot 1 previously made and the date and time, stored in the memory 110, at which the robot 1 made the emotional expression.

Assume that the main controller 105 determines in step S1303 that the emotional expression that the main controller 105 causes the robot 1 to make is the same expression as the emotional expression chosen in the previous expression choosing process and the previous expression choosing process has been performed within the most recent certain period of time (YES in step S1303). In this case, the main controller 105 ends the expression execution process.

On the other hand, assume that the main controller 105 determines in step S1303 that the emotional expression that the main controller 105 causes the robot 1 to make is not the same expression as the emotional expression that the main controller 105 previously caused the robot 1 to make. Alternatively, assume that the main controller 105 determines that the previous expression choosing process has not been performed within the most recent certain period of time (NO in step S1303). In these cases, the main controller 105 executes step S1304 and subsequent steps to cause the robot 1 to make the emotional expression chosen in the expression choosing process.

Specifically, in step S1304, the main controller 105 refers to a facial expression X502 and a speech content X503 that, in the expression table T5 (FIG. 5), are associated with an expression X501 matching the identifier representing the emotional expression that the main controller 105 causes the robot 1 to make (step S1304).

Then, the main controller 105 selects one expression identifier from among one or more facial expression identifiers included in the facial expression X502 referred to in step S1304 and selects one speech text sentence from among one or more speech text sentences included in the speech content X503 referred to in step S1304 (step S1305). As mentioned above, in step S1305, the main controller 105 may select one facial expression identifier and one speech text sentences for example either randomly or in a predetermined order.

Next, the main controller 105 controls the display information output controller 109 (FIG. 1) to cause the display 108 to output display information representing a facial expression identified by the one facial expression identifier selected in step S1305 (step S1306). Further, the main controller 105 controls the audio information output controller 107 (FIG. 1) to cause it to generate an audio signal representing the one speech text sentence selected in step S1305 and cause the speaker 106 to output the sound of the speech text sentence represented by the audio signal (step S1307).

Assume, for example, that the emotional expression that the main controller 105 causes the robot 1 to make is a "fearful expression". In this case, in step S1305, the main controller 105 selects the facial expression X502 "facial expression 3" and the speech content X503 "Oh, I'm scared! I'm scared!", which are associated with the expression X501 "fearful expression" in the expression table T5 (FIG. 5).

In this case, in step S1306, the main controller 105 controls the display information output controller 109 (FIG. 1) to cause the display 108 to output display information (perform a first display) representing a facial expression identified by the facial expression X502 "facial expression 3". Further, in step S1307, the main controller 105 controls the audio information output controller 107 (FIG. 1) to cause the speaker 106 to output a sound (first sound) representing the speech content X503 "Oh, I'm scared! I'm scared!".

Similarly, in a case where the emotional expression that the main controller 105 causes the robot 1 to make is a "confused expression", the main controller 105 executes steps S1305 to S1307 in such a way as to cause the display 108 to output display information (perform a first display) representing a facial expression identified by the facial expression X502 "facial expression 4", which is associated with the expression X501 "confused expression" in the expression table T5 (FIG. 5), and cause the speaker 106 to output a sound (first sound) representing the speech content X503 "No! No! Lower me!", which is associated with the expression X501 "confused expression" in the expression table T5 (FIG. 5).

Further, in a case where the emotional expression that the main controller 105 causes the robot 1 to make is a "joyful expression", the main controller 105 executes steps S1305 to S1307 in such a way as to cause the display 108 to output display information (perform a second display) representing a facial expression identified by the facial expression X502 "facial expression 1", which is associated with the expression X501 "joyful expression" in the expression table T5 (FIG. 5), and cause the speaker 106 to output a sound (second sound) representing the speech content X503 "Great! Great!", which is associated with the expression X501 "joyful expression" in the expression table T5 (FIG. 5).

Alternatively, in a case where the emotional expression that the main controller 105 causes the robot 1 to make is a "joyful expression", the main controller 105 may execute steps S1305 to S1307 in such a way as to cause the display 108 to output display information (perform a second display) representing a facial expression identified by the facial expression X502 "facial expression 2", which is associated with the expression X501 "joyful expression" in the expression table T5 (FIG. 5), and cause the speaker 106 to output a sound (second sound) representing the speech content X503 "I like it here!", which is associated with the expression X501 "joyful expression" in the expression table T5 (FIG. 5).

Further, in a case where the emotional expression that the main controller 105 causes the robot 1 to make is a "grateful expression", the main controller 105 executes steps S1305 to S1307 in such a way as to cause the display 108 to output display information (perform a fifth display) representing a facial expression identified by the facial expression X502 "facial expression 5", which is associated with the expression X501 "grateful expression" in the expression table T5 (FIG. 5), and cause the speaker 106 to output a sound (fifth sound) representing the speech content X503 "Thank you! Please hold me firmly!", which is associated with the expression X501 "grateful expression" in the expression table T5 (FIG. 5).

After step S1307, the main controller 105 stores, in the memory 110 (FIG. 1), an identifier (e.g. "joyful expression") for identifying the emotional expression that the main controller 105 has caused the robot 1 to make this time and the current time (step S1308).

As noted above, the configuration of the first embodiment makes it possible to alter the emotional expression of the robot 1 according to the height H1 that the robot 1 is above a floor or obstacle located directly underneath the robot 1 when the user has lifted the robot 1. This makes it possible to, in a case where the robot 1 possibly breaks down when the user for example inadvertently drops the robot 1 and the robot 1 collides with a floor or obstacle located directly underneath the robot 1, cause the robot 1 to make an emotional expression representing a warning to the effect that such a breakdown may take place.

Second Embodiment

Figure 14:
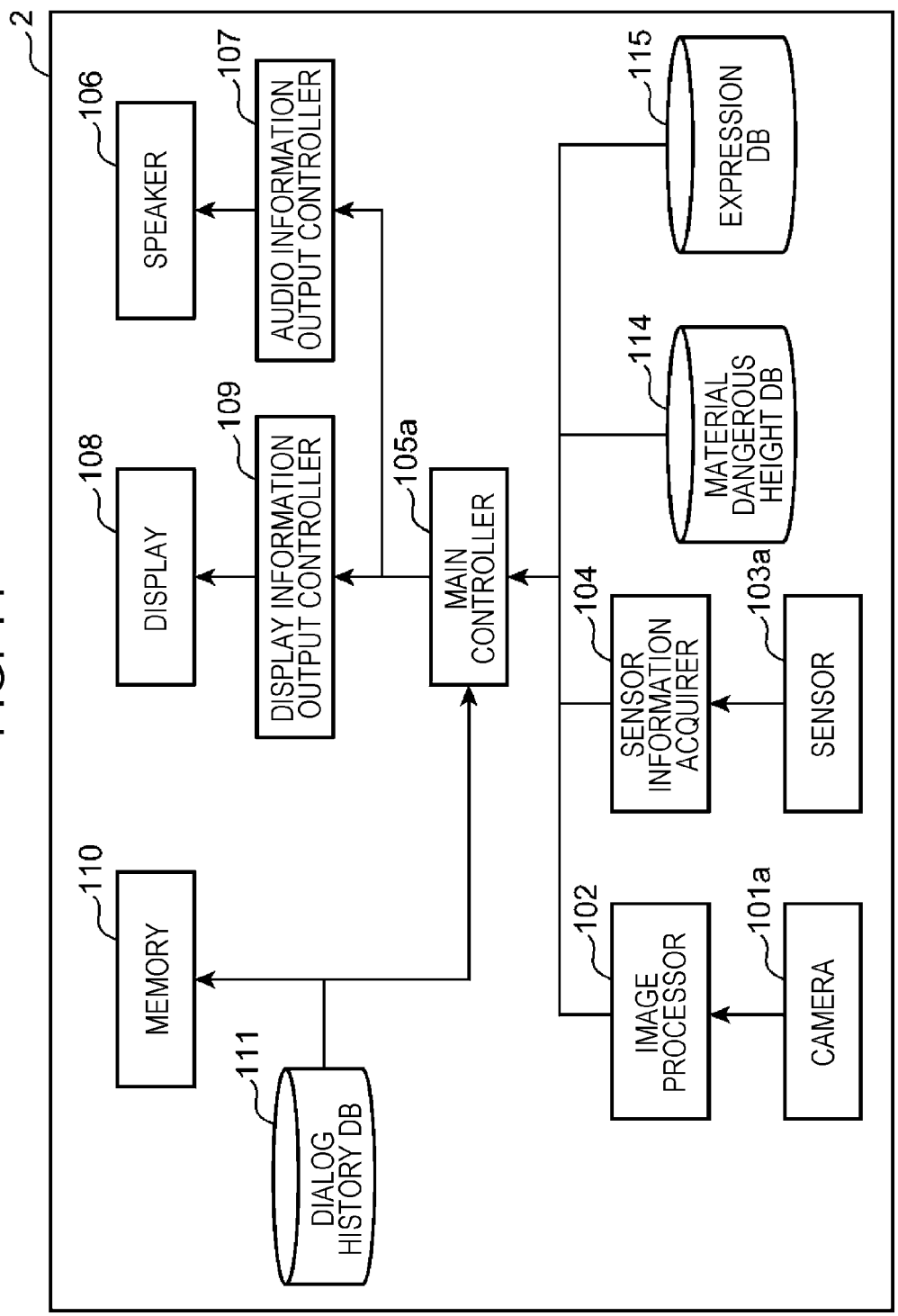
FIG. 14 is a block diagram showing an example of a functional configuration of a robot according to a second embodiment of the present disclosure.

The following describes a robot 2 according to a second embodiment of the present disclosure. FIG. 14 is a block diagram showing an example of a functional configuration of the robot 2 according to the second embodiment of the present disclosure. In the following, those of the constituent elements which are the same as those of the first embodiment are given the same signs and omitted from the description and only those parts which are different from those of the first embodiment are described.

First, the functional configuration of the robot 2 is described. The robot 2 is configured such that the material of a floor or obstacle located directly underneath the robot 2 is identified after the robot 2 has been lifted by a user. For this purpose, as shown in FIG. 14, the robot 2 includes a camera 101a configured to be able to acquire an image of an area directly underneath the robot 2.

Further, the robot 2 is configured such that the height H1 that the robot 2 is above a floor or obstacle can be measured after the robot 2 has been lifted by the user. For this purpose, the robot 2 include a sensor 103a configured to further include the distance sensor (third sensor) in addition to the acceleration sensor. Further, since it is no longer necessary to estimate the position of the robot 2, the robot 2 does not include the room map DB 112 (FIG. 1) and the position dangerous height DB 113 (FIG. 1).

Overall Operation of Control that Alters Emotional Expression of Robot 2

Figure 15:
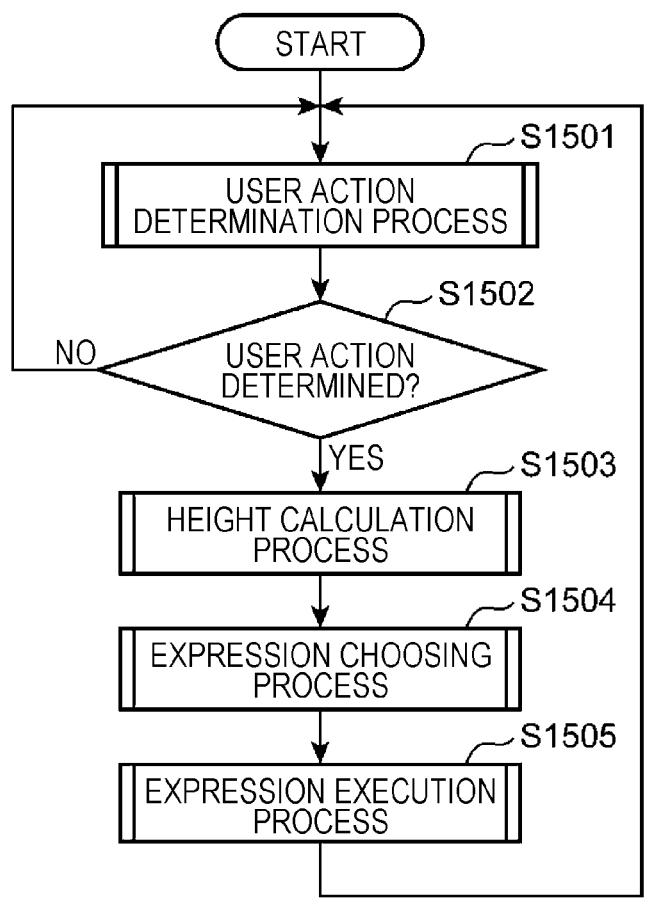
FIG. 15 is a flow chart showing an example of control that alters the emotional expression of the robot according to the second embodiment of the present disclosure.

The following describes an overall operation of control in which a main controller 105a alters the emotional expression of the robot 2 according to the current position of the robot 2 in the second embodiment. FIG. 15 is a flow chart showing an example of control that alters the emotional expression of the robot 2 according to the second embodiment of the present disclosure.

As shown in FIG. 15, in the second embodiment 2, unlike in the first embodiment, the main controller 105a does not execute the process of creating the position dangerous height table T3 (FIG. 3) in step S601 of FIG. 6 but executes steps S1501 and S1502, which are similar to steps S602 and S603 of FIG. 6. Then, the main controller 105a executes a height calculation process that is different in processing content from step S604 of FIG. 6 (step S1503), executes an expression choosing process that is different in processing content from step S605 of FIG. 6 (step S1504), and executes step S1505, which is similar to step S606 (step S1505).

Details of Height Calculation Process in Robot 2

Figure 16:
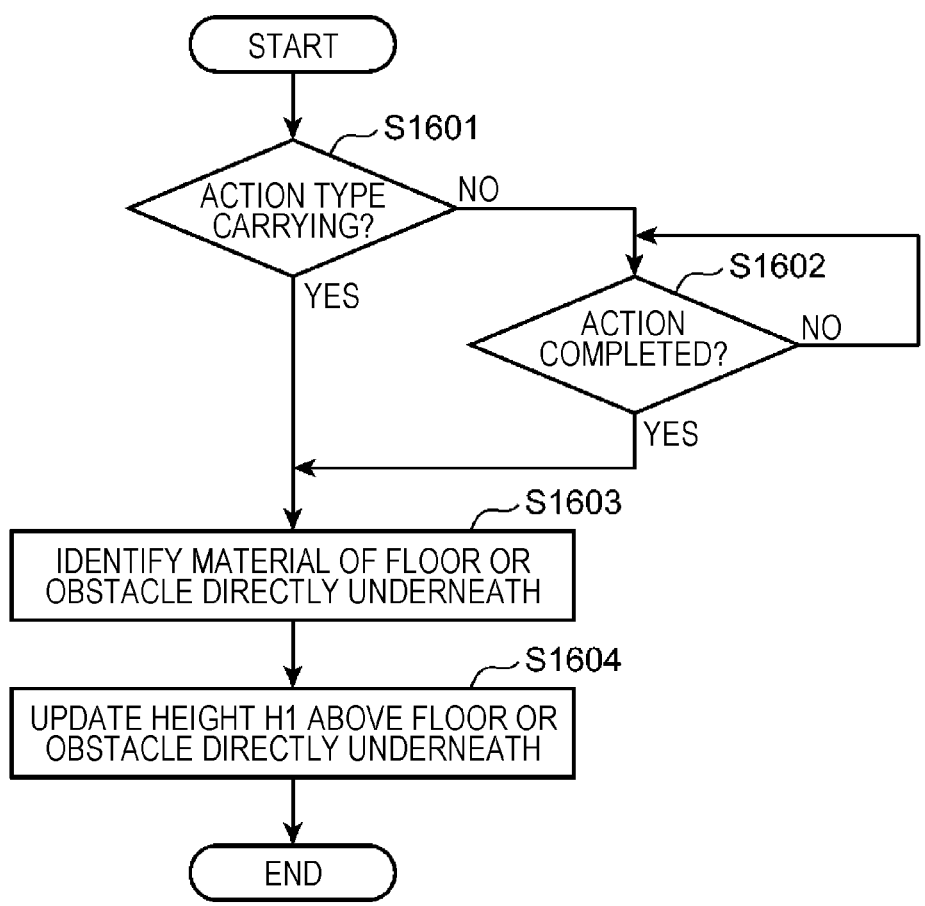
FIG. 16 is a flow chart showing an example of a height calculation process according to the second embodiment of the present disclosure.

The following describes the details of the height calculation process in step S1503 (FIG. 15). FIG. 16 is a flow chart showing an example of the height calculation process according to the second embodiment of the present disclosure.

As shown in FIG. 16, at the start of the height calculation process, the main controller 105a determines whether the type of a user action as set in the user action determination process of step S1501 (FIG. 15) is "carrying" (step S1601).

In a case where the type of the user action is "carrying" (YES in step S1601), the main controller 105a causes the image processor 102 to execute a publicly-known image recognition process to cause it to identify (determine), from an image of the area directly underneath the robot 2 as acquired by the camera 101a, the material of a floor or obstacle located directly underneath the robot 2 (step S1603).

On the other hand, in a case where the type of the user action is not "carrying" (NO in step S1601), the main controller 105a determines that the type of the user action is "lifting" or "lowering", and waits until completion of the user action (step S1602).

Specifically, in step S1602, in a case where the type of the user action is "lifting", the main controller 105a determines that the user action is complete in a case where the acceleration in Z-axis direction as detected by the acceleration sensor constituting the sensor 103a (FIG. 14) becomes equal to or lower than a positive predetermined threshold. On the other hand, in a case where the type of the user action is "lowering", the main controller 105a determines that the user action is complete in a case where the acceleration in Z-axis direction as detected by the acceleration sensor becomes equal to or higher than a negative predetermined threshold. Upon completion of the user action (YES in step S1602), the main controller 105a executes step S1603.

After step S1603, the main controller 105a causes the distance sensor constituting the sensor 103a (FIG. 14) to detect the height that the robot 2 is above a floor or obstacle, and updates the height H1 according to the height that the robot 2 is above a floor or obstacle thus detected (step S1604).

Details of Expression Choosing Process

Figure 17:
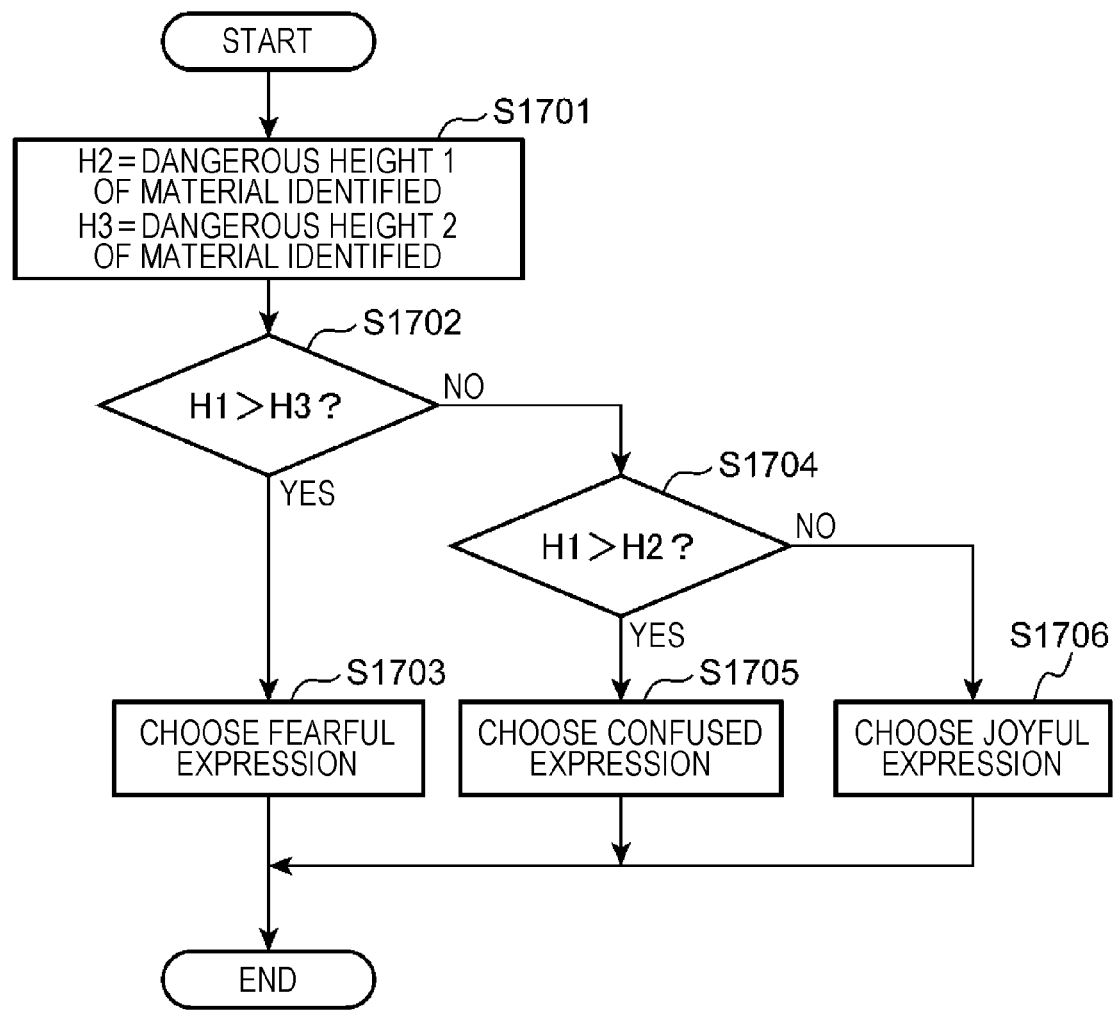
FIG. 17 is a flow chart showing an example of an expression choosing process according to the second embodiment of the present disclosure.

The following describes the details of the expression choosing process in step S1504 (FIG. 15). FIG. 17 is a flow chart showing an example of the expression choosing process according to the second embodiment of the present disclosure. As shown in FIG. 17, first, at the start of the expression choosing process, the main controller 105a acquires a dangerous height 1 X402 and a dangerous height 2 X403 (heights corresponding to a material) that, in the material dangerous height table T4 (FIG. 4), are associated with a material X401 matching the material of a floor or obstacle located directly underneath the robot 2 as identified in step S1603 (FIG. 16). Then, the main controller 105a sets the dangerous height 1 X402 thus acquired as a variable H2 (H2=Dangerous Height 1 X402) and sets the dangerous height 2 X403 thus acquired as a variable H3 (H3=Dangerous Height 2 X403) (step S1701).

Next, the main controller 105a executes steps S1702 to S1706, which are similar to steps S1202 to S1206 of the first embodiment, with use of the height H1 that the robot 2 is above a floor or obstacle updated in step S1604 (FIG. 16) and the variables H2 and H3 set in step S1701 to choose the emotional expression that the main controller 105a causes the robot 2 to make (steps S1702 to S1706).

As noted above, the configuration of the second embodiment makes it possible to alter the emotional expression of the robot 2 according to the material of a floor or obstacle located directly underneath the robot 2 when the user has lifted the robot 2 and the height H1 that the robot 2 is above the floor or obstacle. This makes it possible to, in a case where the robot 1 possibly breaks down when the user for example inadvertently drops the robot 2 and the robot 2 collides with a floor or obstacle located directly underneath the robot 2, cause the robot 2 to make an emotional expression representing a warning to the effect that such a breakdown may take place.

Third Embodiment

Figure 18:
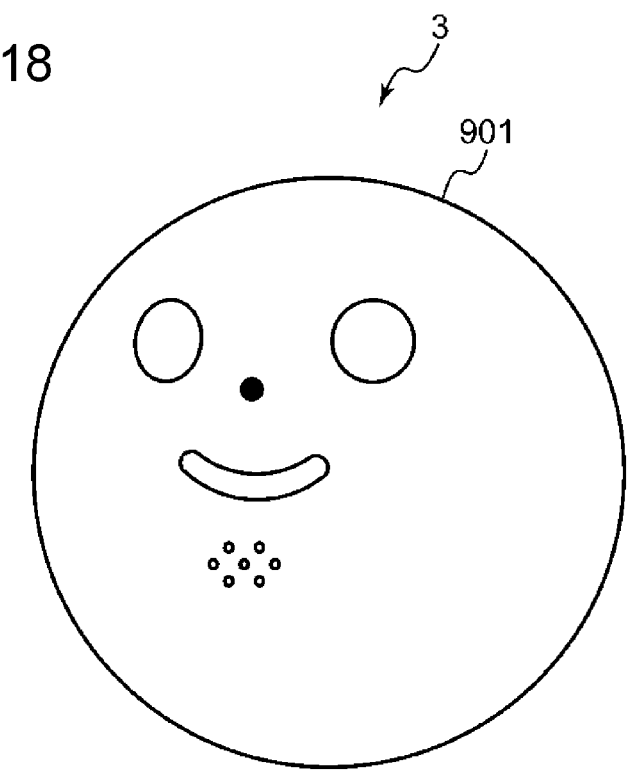
FIG. 18 is an appearance perspective view of a robot according to a third embodiment of the present disclosure.

A third embodiment describes an example in which the robot 1 of the first embodiment or the robot 2 of the second embodiment is packaged as a spherical robot 3. FIG. 18 is an appearance perspective view of the robot 3 according to the third embodiment of the present disclosure. As shown in FIG. 18, the robot 3 includes a spherical housing 901. The housing 901 is constituted, for example, by a transparent member or a semitransparent member.

Figure 19:
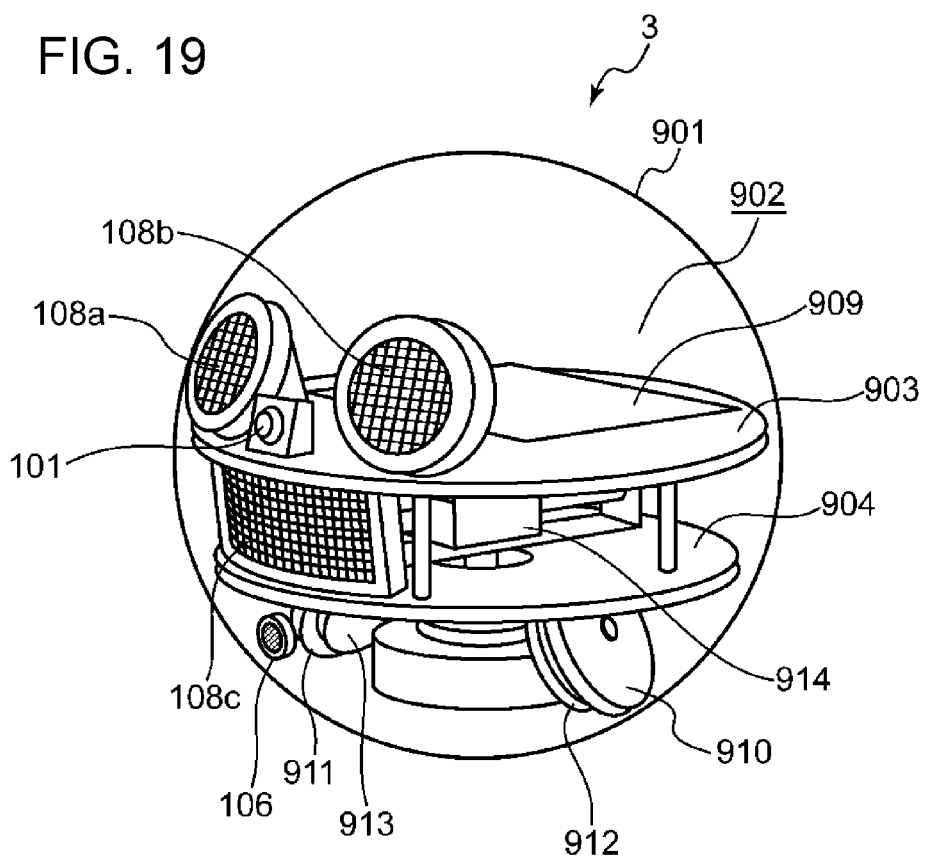
FIG. 19 is an internal perspective view of the robot according to the third embodiment of the present disclosure.

FIG. 19 is an internal perspective view of the robot 3 according to the third embodiment of the present disclosure. As shown in FIG. 19, the robot 3 includes a frame 902 disposed in an inside part of the housing 901. The frame 902 includes a first rotating plate 903 and a second rotating plate 904. The first rotating plate 903 is located above the second rotating plate 904.

The display 108 (FIGS. 1 and 14) includes a first display unit 108a, a second display unit 108b, and a third display unit 108c. The first display unit 108a and the second display unit 108b are attached to an upper surface of the first rotating plate 903. The third display unit 108c is attached to an upper surface of the second rotating plate 904.

The first display unit 108a, the second display unit 108b, and the third display unit 108c are constituted, for example, by a plurality of light-emitting diodes. The first display unit 108a, the second display unit 108b, and the third display unit 108c are controlled by the display information output controller 109 (FIGS. 1 and 14) to display display information representing a facial expression of the robot 3.

Specifically, the first display unit 108a, the second display unit 108b, and the third display unit 108c control the turning on of each individual one of the plurality of light-emitting diodes and thereby display the facial expression of the robot 3 with both eyes and a mouth as shown in FIG. 18. The display information representing the facial expression of the robot 3 is constituted by images of the right and left eyes and mouth of the face of the robot 3. The first display unit 108a displays a right-eye image included in the display information. The second display unit 108b displays a left-eye image included in the display information. The third display unit 108c displays a mouth image included in the display information. The right-eye, left-eye, and mouth images thus displayed are emitted outward through the housing 901 composed of the transparent or semitransparent member.

As shown in FIG. 19, the camera 101 (FIGS. 1 and 14) is attached to an upper surface of the first rotating plate 903 and constitutes the nose of the face of the robot 3.

The speaker 106 (FIGS. 1 and 14) is attached to the frame 902 so that its output screen faces front and is disposed in a position of the chin of the face of the robot 3. As shown in FIG. 18, the housing 901 has a plurality of small holes formed in a position that is equivalent to the chin of the robot 3.

As shown in FIG. 19, the robot 3 includes a control circuit 909 attached to the upper surface of the first rotating plate 903. The control circuit 909 is provided with the microcomputer constituting the image processor 102, the sensor information acquirer 104, the main controller 105 (FIG. 1) or 105a (FIG. 14), the audio information output controller 107 (FIGS. 1 and 14), and the display information output controller 109 (FIGS. 1 and 14). Further, the control circuit 909 is provided with the storage devices constituting the memory 110 (FIGS. 1 and 14), the dialog history DB 111 (FIGS. 1 and 14), the room map DB 112 (FIG. 1), the position dangerous height DB 113 (FIG. 1), the material dangerous height DB 114 (FIGS. 1 and 14), and the expression DB 115 (FIGS. 1 and 14). Further, the control circuit 909 is provided with the sensor 103 (FIG. 1) or 103a (FIG. 14).

The robot 3 includes a first drive wheel 910 and a second drive wheel 911 each of which is attached to a lower surface of the second rotating plate 904 and is in contact with an inner circumferential surface of the housing 901. Further, the first drive wheel 910 has a first motor 912 that drives the first drive wheel 910. Similarly, the second drive wheel 911 has a second motor 913 that drives the second drive wheel 911. That is, the first drive wheel 910 and the second drive wheel 911 are each driven by an independent individual motor. The first drive wheel 910 and the second drive wheel 911 constitute a pair of drive wheels.

Rotating the first drive wheel 910 and the second drive wheel 911 in a forward direction results in power that causes the housing 901 to rotate in the forward direction. This causes the robot 3 to move forward. Conversely, rotating the first drive wheel 910 and the second drive wheel 911 in a backward direction causes the robot 3 to move backward. Further, rotating the first drive wheel 910 and the second drive wheel 911 in opposite directions to each other results in power that causes the housing 901 to make a rotational motion on a vertical axis passing through the center of the housing 901. That is, the robot 3 rotates in a counterclockwise or clockwise direction. The robot 3 moves by making such a forward or backward rotational motion.

The main controller 105 (FIG. 1) or 105a (FIG. 14) controls the directions and speeds of rotation of the first drive wheel 910 and the second drive wheel 911 by controlling the driving of the first motor 912 and the second motor 913. By so doing, the main controller 105 (FIG. 1) or 105a (FIG. 14) controls the running of the robot 3.

The robot 3 includes a counter weight 914 provided between the first rotating plate 903 and the second rotating plate 904. The counter weight 914 is located somewhat below the center of the housing 901. For this reason, the robot 3 has its center of gravity located below the center of the housing 901. This makes it possible to stabilize the motions of the robot 3. The counter weight 914 contains a weight driving motor (not illustrated). The main controller 105 (FIG. 1) or 105a (FIG. 14) controls the driving motor to move the counter weight 914 from one position to another to control the attitude of the robot 3.

Further, the robot 3 further includes a secondary battery (not illustrated) that is charged by a charger (not illustrated).

Specific Examples of Emotional Expressions

Figure 20:
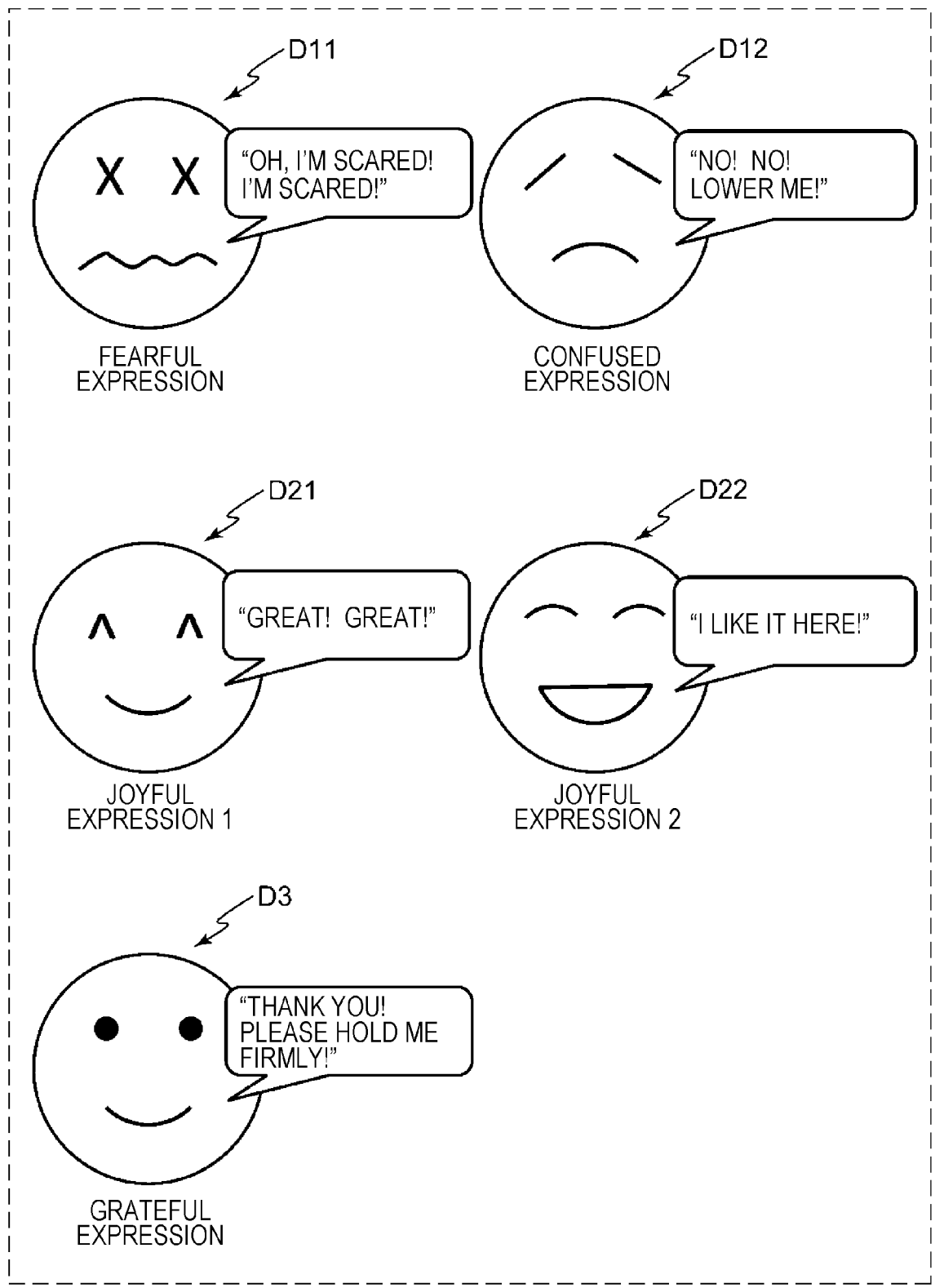
FIG. 20 illustrates diagrams showing examples of emotional expressions of the robot according to the third embodiment of the present disclosure.

The following describes specific examples of emotional expressions of the robot 3. FIG. 20 illustrates diagrams showing examples of emotional expressions of the robot 3 according to the third embodiment of the present disclosure.

Assume that in the expression choosing process of step S605 (FIG. 6) or S1505 (FIG. 15), an expression represented by the expression X501 "fearful expression" in the expression table T5 (FIG. 5) has been chosen as the emotional expression that the main controller 105 (FIG. 1) or 105*a* (FIG. 14) causes the robot 3 to make. In this case, the main controller 105 (FIG. 1) or 105*a* (FIG. 14) selects, for example, the facial expression X502 "facial expression 3" and the speech content X503 "Oh, I'm scared! I'm scared!", which are associated with the expression X501 "fearful expression" in the expression table T5 (FIG. 5).

Then, the main controller 105 or 105*a* controls the display information output controller 109 (FIGS. 1 and 14) to cause the display 108 (i.e. the first display unit 108*a*, the second display unit 108*b*, and the third display unit 108*c*) to, as illustrated by sign D11 in FIG. 20, output display information representing a fearful facial expression identified by the facial expression X502 "facial expression 3". Further, the main controller 105 or 105*a* controls the audio information output controller 107 (FIGS. 1 and 14) to cause the speaker 106 to, as illustrated by sign D11 in FIG. 20, output a sound representing the speech content X503 "Oh, I'm scared! I'm scared!", which raises an alarm. This allows the robot 3 to make the emotional expression represented by the expression X501 "fearful expression".

Assume also that in the expression choosing process of step S605 (FIG. 6) or S1505 (FIG. 15), an expression represented by the expression X501 "confused expression" in the expression table T5 (FIG. 5) has been chosen as the emotional expression that the main controller 105 (FIG. 1) or 105*a* (FIG. 14) causes the robot 3 to make. In this case, the main controller 105 (FIG. 1) or 105*a* (FIG. 14) selects, for example, the facial expression X502 "facial expression 4" and the speech content X503 "No! No! Lower me!", which are associated with the expression X501 "confused expression" in the expression table T5 (FIG. 5).

Then, the main controller 105 or 105*a* controls the display information output controller 109 (FIGS. 1 and 14) to cause the display 108 (i.e. the first display unit 108*a*, the second display unit 108*b*, and the third display unit 108*c*) to, as illustrated by sign D12 in FIG. 20, output display information representing a confused facial expression identified by the facial expression X502 "facial expression 4". Further, the main controller 105 or 105*a* controls the audio information output controller 107 (FIGS. 1 and 14) to cause the speaker 106 to, as illustrated by sign D12 in FIG. 20, output a sound representing the speech content X503 "No! No! Lower me!", which requests the user to move the robot 3 to a lower height. This allows the robot 3 to make the emotional expression represented by the expression X501 "confused expression".

Assume also that in the expression choosing process of step S605 (FIG. 6) or S1505 (FIG. 15), an expression represented by the expression X501 "joyful expression" in the expression table T5 (FIG. 5) has been chosen as the emotional expression that the main controller 105 (FIG. 1) or 105*a* (FIG. 14) causes the robot 3 to make. In this case, the main controller 105 (FIG. 1) or 105*a* (FIG. 14) selects, for example, the facial expression X502 "facial expression 1" and the speech content X503 "Great! Great!", which are associated with the expression X501 "joyful expression" in the expression table T5 (FIG. 5).

Then, the main controller 105 or 105*a* controls the display information output controller 109 (FIGS. 1 and 14) to cause the display 108 (i.e. the first display unit 108*a*, the second display unit 108*b*, and the third display unit 108*c*) to, as illustrated by sign D21 in FIG. 20, output display information representing a first joyful facial expression identified by the facial expression X502 "facial expression 1". Further, the main controller 105 or 105*a* controls the audio information output controller 107 (FIGS. 1 and 14) to cause the speaker 106 to, as illustrated by sign D21 in FIG. 20, output a sound representing the first speech content X503 "Great! Great!", which is positive about the height at which the robot 3 is. This allows the robot 3 to make the emotional expression represented by the expression X501 "joyful expression".

In a case where, in the expression choosing process of step S605 (FIG. 6) or S1505 (FIG. 15), an expression represented by the expression X501 "joyful expression" in the expression table T5 (FIG. 5) has been chosen as the emotional expression that the main controller 105 (FIG. 1) or 105*a* (FIG. 14) causes the robot 3 to make, the main controller 105 (FIG. 1) or 105*a* (FIG. 14) may select, for example, the facial expression X502 "facial expression 2" and the speech content X503 "I like it here!", which are associated with the expression X501 "joyful expression" in the expression table T5 (FIG. 5).

In this case, the main controller 105 or 105*a* controls the display information output controller 109 (FIGS. 1 and 14) to cause the display 108 (i.e. the first display unit 108*a*, the second display unit 108*b*, and the third display unit 108*c*) to, as illustrated by sign D22 in FIG. 20, output display information representing a second joyful facial expression identified by the facial expression X502 "facial expression 2". Further, the main controller 105 or 105*a* controls the audio information output controller 107 (FIGS. 1 and 14) to cause the speaker 106 to, as illustrated by sign D22 in FIG. 20, output a sound representing the second speech content X503 "I like it here!", which is positive about the height at which the robot 3 is.

Assume also that in step S1302 (FIG. 6), an expression represented by the expression X501 "grateful expression" in the expression table T5 (FIG. 5) has been chosen as the emotional expression that the main controller 105 (FIG. 1) or 105*a* (FIG. 14) causes the robot 3 to make. In this case, the main controller 105 (FIG. 1) or 105*a* (FIG. 14) selects, for example, the facial expression X502 "facial expression 5" and the speech content X503 "Thank you! Please hold me firmly!", which are associated with the expression X501 "grateful expression" in the expression table T5 (FIG. 5).

Then, the main controller 105 or 105*a* controls the display information output controller 109 (FIGS. 1 and 14) to cause the display 108 (i.e. the first display unit 108*a*, the second display unit 108*b*, and the third display unit 108*c*) to, as illustrated by sign D3 in FIG. 20, output display information representing a smile identified by the facial expression X502 "facial expression 5". Further, the main controller 105 or 105*a* controls the audio information output controller 107 (FIGS. 1 and 14) to cause the speaker 106 to, as illustrated by sign D3 in FIG. 20, output a sound representing the speech content X503 "Thank you! Please hold me firmly!", which expresses gratitude. This allows the robot 3 to make the emotional expression represented by the expression X501 "grateful expression".

It should be noted that the first to third embodiments are merely examples of embodiments according to the present disclosure and are not intended to limit the present disclosure to the first to third embodiments. For example, the following modifications may be implemented.

First Modification

Steps S1301 and S1302 (FIG. 13) may be omitted from the first or second embodiment.

Second Modification

In the first embodiment, the position dangerous height information that is managed with use of the position dangerous height table T3 (FIG. 3) may be configured not to include the dangerous height 2 X306 (FIG. 3) and the material dangerous height information that is managed with use of the material dangerous height table T4 (FIG. 4) may be configured not to include the dangerous height 2 X403 (FIG. 4). Accordingly, steps S1202 and S1203 shown in FIG. 12 may be omitted so that step S1204 may be executed after step S1201 with an omission of the setting of the variable H3 in step S1201.

Similarly, in the second embodiment, the material dangerous height information that is managed with use of the material dangerous height table T4 (FIG. 4) may be configured not to include the dangerous height 2 X403 (FIG. 4). Accordingly, steps S1702 and S1703 shown in FIG. 17 may be omitted so that step S1704 may be executed after step S1701 with an omission of the setting of the variable H3 in step S1701.

Third Modification

Step S1206 shown in FIG. 12 may be omitted from the first embodiment. Similarly, step S1706 shown in FIG. 17 may be omitted from the second embodiment.

Fourth Modification

An apparatus according to an embodiment of the present disclosure is applicable not only to the robots 1 and 2 but also to an apparatus, such as a laptop personal computer or a home electrical appliance, that is moved by a user and is similar in configuration to the robots 1 and 2. In this case, the position dangerous height information that is managed with use of the position dangerous height table T3 (FIG. 3) and the material dangerous height information that is managed with use of the material dangerous height table T4 (FIG. 4), which are used in step S601 (FIG. 6), may be edited by the user at an external device and may be acquired from the external device by a communication device of the apparatus.

The present disclosure is useful for preventing an apparatus such as a robot from breaking down in a case where the apparatus is lifted and inadvertently dropped by a user.

What is claimed is:

1. An apparatus that is moved by a user, the apparatus comprising:
    a first sensor that detects a motion and a moving direction of the apparatus;
    a second sensor that measures a movement distance in a vertical direction of the apparatus;
    a camera that acquires a picture of an area around the apparatus;
    a processor;
    a display; and
    a speaker,
    wherein the processor determines, based on a result of detection by the first sensor, whether the apparatus is moved in the vertical direction, and
    in a case where the processor determines that the apparatus is moved in the vertical direction, the processor:
        calculates, based on a result of measurement by the second sensor, a distance from the apparatus to an object located directly underneath the apparatus;
        measures a two-dimensional position of the apparatus based on the picture acquired by the camera;
        compares the distance with a height corresponding to the two-dimensional position, the height being in a first table showing correspondence relationships between two-dimensional positions of the apparatus and heights that possibly damage the apparatus when the apparatus falls at the two-dimensional positions;
        in a case where the distance is greater than the height corresponding to the two-dimensional position, causes the display to perform a first display and causes the speaker to output a first sound; and
        in a case where the distance is not greater than the height corresponding to the two-dimensional position, causes the display to perform a second display and causes the speaker to output a second sound.

2. The apparatus according to claim 1, wherein, in a case where the processor determines that the apparatus is not moved in the vertical direction, the processor determines, based on a result of detection by the first sensor, whether the apparatus is moved in a horizontal direction, and
    in a case where the processor determines that the apparatus is moved in the horizontal direction, the processor:
        measures the two-dimensional position of the apparatus based on the picture;
        calculates the distance with reference to a second table showing a correspondence relationship between the two-dimensional position of the apparatus and a height of an object that is present in the two-dimensional position;
        compares the distance with the height corresponding to the two-dimensional position in the first table;
        in the case where the distance is greater than the height corresponding to the two-dimensional position, causes the display to perform the first display and causes the speaker to output the first sound; and
        in the case where the distance is not greater than the height corresponding to the two-dimensional position, causes the display to perform the second display and causes the speaker to output the second sound.

3. The apparatus according to claim 1, wherein the display displays a facial expression of the apparatus, the facial expression including eyes and a mouth,
    the first display shows the facial expression as fearful or confused, and
    the first sound is an alarm or requests the user to move the apparatus to a lower height.

4. The apparatus according to claim 1, wherein the display displays a facial expression of the apparatus, the facial expression including eyes and a mouth,
    the second display shows the facial expression as joyful, and
    the second sound is positive about a height of the apparatus.

5. The apparatus according to claim 1, wherein, in the first table, the heights that possibly damage the apparatus when the apparatus falls at the two-dimensional position include a first height and a second height, the second height being higher than the first height,
    the first display includes a third display and a fourth display,
    the first sound includes a third sound and a fourth sound, the display displays a facial expression of the apparatus, the facial expression including eyes and a mouth, in a case where the distance is greater than the first height corresponding to the two-dimensional position and not greater than the second height corresponding to the two-dimensional position, the processor causes the display to perform the third display and causes the speaker to output the third sound, in a case where the distance is greater than the second height corresponding to the two-dimensional position, the processor causes the display to perform the fourth display and causes the speaker to output the fourth sound, the third display shows the facial expression as confused, the fourth display shows the facial expression as fearful, the third sound requests the user to move the apparatus to a lower height, and the fourth sound is an alarm.

6. The apparatus according to claim 1, wherein the processor further determines, with reference to a database storing a dialog history between the apparatus and the user, whether, in a predetermined period of time before a present time in the dialog history, the apparatus requested the user to move the apparatus upward in the vertical direction, and in a case where the processor determines that the apparatus requested the user to move the apparatus upward in the vertical direction and the distance is greater than the height corresponding to the two-dimensional position, the processor causes the display to perform a third display and causes the speaker to output a third sound.

7. The apparatus according to claim 6, wherein the third display shows a smile, and the third sound expresses gratitude.

8. The apparatus according to claim 1, wherein the first sensor and the second sensor include an acceleration sensor that detects acceleration in a horizontal direction and the vertical direction of the apparatus.

9. A system, comprising:
a robot that is moved by a user;
a first sensor that detects a motion and a moving direction of the robot;
a second sensor that measures a movement distance in a vertical direction of the robot;
a camera that acquires a picture of an area around the robot;
a processor;
a display; and
a speaker,
wherein the processor determines, based on a result of detection by the first sensor, whether the robot is moved in the vertical direction, and
in a case where the processor determines that the robot is moved in the vertical direction, the processor:
calculates, based on a result of measurement by the second sensor, a distance from the robot to an object located directly underneath the robot;
measures a two-dimensional position of the robot based on the picture acquired by the camera;
compares the distance with a height corresponding to the two-dimensional position, the height being in a first table showing correspondence relationships between two-dimensional positions of the robot and heights that possibly damage the robot when the robot falls at the two-dimensional positions;
in a case where the distance is greater than the height corresponding to the two-dimensional position, causes the display to perform a first display and causes the speaker to output a first sound; and
in a case where the distance is not greater than the height corresponding to the two-dimensional position, causes the display to perform a second display and causes the speaker to output a second sound.

10. A method for causing an apparatus that is moved by a user to express an emotion, the apparatus including a first sensor that detects a motion and a moving direction of the robot, a second sensor that measures a movement distance in a vertical direction of the robot, a camera that acquires a picture of an area around the robot, a display, and a speaker, the method comprising:

determining, based on a result of detection by the first sensor, whether the robot is moved in the vertical direction; and in a case of determining the apparatus is moved in the vertical direction:
calculating, based on a result of measurement by the second sensor, a distance from the apparatus to an object located directly underneath the apparatus;
measuring a two-dimensional position of the apparatus based on the picture acquired by the camera;
comparing the distance with a height corresponding to the two-dimensional position, the height being in a first table showing correspondence relationships between two-dimensional positions of the apparatus and heights that possibly damage the apparatus when the robot falls at the two-dimensional positions;
in a case where the distance is greater than the height corresponding to the two-dimensional position, causing the display to perform a first display and causing the speaker to output a first sound; and
in a case where the distance is not greater than the height corresponding to the two-dimensional position, causing the display to perform a second display and causing the speaker to output a second sound.

11. A non-transitory computer-readable recording medium storing a program for causing a processor of the apparatus to execute the method according to claim 10.

12. An apparatus that is moved by a user, the apparatus comprising:
a first sensor that detects a motion and a moving direction of the apparatus;
a second sensor that detects an object located directly underneath the apparatus;
a camera that acquires a picture of an area around the apparatus;
a processor;
a display; and
a speaker,
wherein the processor determines, based on a result of detection by the first sensor, whether the apparatus is moved in a vertical direction, and
in a case where the processor determines that the apparatus is moved in the vertical direction, the processor:
calculates, based on a result of detection by the second sensor, a distance from the apparatus to the object located directly underneath the apparatus;
determines, based on the picture acquired by the camera, a material of the object located directly underneath the apparatus;
compares the distance with a height corresponding to the material, the height being in a table showing correspondence relationships between materials of objects and heights that possibly damage the apparatus when the apparatus falls onto the objects;

in a case where the distance is greater than the height corresponding to the material, causes the display to perform a first display and causes the speaker to output a first sound; and in a case where the distance is not greater than the height corresponding to the material, causes the display to perform a second display and causes the speaker to output a second sound.

13. The apparatus according to claim 12, wherein, in a case where the processor determines that the apparatus is not moved in the vertical direction, the processor determines, based on a result of detection by the first sensor, whether the apparatus is moved in a horizontal direction, in a case where the processor determines that the apparatus is moved in the horizontal direction, the processor:

calculates, based on the result of detection by the second sensor, the distance from the apparatus to the object located directly underneath the apparatus, determines, based on the picture, the material of the object located directly underneath the apparatus, compares the distance with the height corresponding to the material in the table, in the case where the distance is greater than the height corresponding to the material, causes the display to perform the first display and causes the speaker to output the first sound, and in the case where the distance is not greater than the height corresponding to the material, causes the display to perform the second display and causes the speaker to output the second sound.

14. The apparatus according to claim 12, wherein the display displays a facial expression of the apparatus, the facial expression including eyes and a mouth, the first display shows the facial expression as fearful or confused, and the first sound is an alarm or requests the user to move the apparatus to a lower height.

15. The apparatus according to claim 12, wherein the display displays a facial expression of the apparatus, the facial expression including eyes and a mouth, the second display shows the facial expression as joyful, and the second sound is positive about a height of the apparatus.

16. The apparatus according to claim 12, wherein, in the table, the heights that possibly damage the apparatus when the apparatus falls onto the objects include a first height and a second height, the second height being higher than the first height, the first display includes a third display and a fourth display, the first sound includes a third sound and a fourth sound, the display displays a facial expression of the apparatus, the facial expression including eyes and a mouth, in a case where the distance is greater than the first height corresponding to the material and the distance is not greater than the second height corresponding to the material, the processor causes the display to perform the third display and causes the speaker to output the third sound, in a case where the distance is greater than the second height corresponding to the material, the processor causes the display to perform the fourth display and causes the speaker to output the fourth sound, the third display shows the facial expression as confused, the fourth display shows the facial expression as fearful, the third sound requests the user to move the apparatus to a lower height, and the fourth sound is an alarm.

17. The apparatus according to claim 12, wherein the processor further determines, with reference to a database storing a dialog history between the apparatus and the user, whether, in a predetermined period of time before a present time in the dialog history, the apparatus requested the user to move the apparatus upward in the vertical direction, and in a case where the processor determines that the apparatus requested the user to move the apparatus upward in the vertical direction and the distance is greater than the height corresponding to the material, the processor causes the display to perform a third display and causes the speaker to output a third sound.

18. The apparatus according to claim 17, wherein the third display shows a smile, and the third sound expresses gratitude.

19. A system, comprising:

a robot that is moved by a user;

a first sensor that detects a motion and a moving direction of the robot;

a second sensor that detects an object located directly underneath the robot;

a camera that acquires a picture of an area around the robot;

a processor;

a display; and a speaker, wherein the processor determines, based on a result of detection by the first sensor, whether the robot is moved in a vertical direction, and in a case where the processor determines that the robot is moved in the vertical direction, the processor:

calculates, based on a result of detection by the second sensor, a distance from the robot to the object located directly underneath the robot;

determines, based on the picture acquired by the camera, a material of the object located directly underneath the robot;

compares the distance with a height corresponding to the material, the height being in a table showing correspondence relationships between materials of objects and heights that possibly damage the robot when the robot falls onto the objects;

in a case where the distance is greater than the height corresponding to the material, causes the display to perform a first display and causes the speaker to output a first sound; and in a case where the distance is not greater than the height corresponding to the material, causes the display to perform a second display and causes the speaker to output a second sound.

20. A method for causing an apparatus that is moved by a user to express an emotion, the apparatus including a first sensor that detects a motion and a moving direction of the apparatus, a second sensor that detects an object located directly underneath the apparatus, a camera that acquires a picture of an area around the apparatus, a display, and a speaker, the method comprising:

determining, based on a result of detection by the first sensor, whether the apparatus is moved in a vertical direction; and in a case of determining the apparatus is moved in the vertical direction:

calculating, based on a result of detection by the second sensor, a distance from the apparatus to the object located directly underneath the apparatus;

determining, based on the picture acquired by the camera, a material of the object located directly underneath the apparatus;

comparing the distance with a height corresponding to the material, the height being in a table showing correspondence relationships between materials of objects and heights that possibly damage the apparatus when the apparatus falls onto the objects;

in a case where the distance is greater than the height corresponding to the material, causing the display to perform a first display and causing the speaker to output a first sound; and in a case where the distance is not greater than the height corresponding to the material, causing the display to perform a second display and causing the speaker to output a second sound.

21. A non-transitory computer-readable recording medium storing a program for causing a processor of the apparatus to execute the method according to claim 20.

* * * * *